(12) United States Patent
Tsaltskan et al.

(10) Patent No.: US 10,110,466 B2
(45) Date of Patent: Oct. 23, 2018

(54) OPTICAL COMMUNICATION SYSTEM WITH DISTRIBUTED WET PLANT MANAGER

(71) Applicant: Tyco Electronics Subsea Communications LLC, Eatontown, NJ (US)

(72) Inventors: Yuriy Tsaltskan, Morganville, NJ (US); Richard Kram, Ocean, NJ (US); Jonathan M. Liss, Marlboro, NJ (US)

(73) Assignee: TYCO ELECTRONICS SUBSEA COMMUNICATIONS LLC, Eatontown, NJ (US)

( * ) Notice: Subject to any disclaimer, the term of this patent is extended or adjusted under 35 U.S.C. 154(b) by 307 days.

(21) Appl. No.: 14/949,164

(22) Filed: Nov. 23, 2015

(65) Prior Publication Data

US 2017/0149650 A1    May 25, 2017

(51) Int. Cl.
*H04B 10/00* (2013.01)
*H04L 12/721* (2013.01)
(Continued)

(52) U.S. Cl.
CPC ............ *H04L 45/124* (2013.01); *G08C 23/06* (2013.01); *H04B 10/80* (2013.01); *H04L 41/12* (2013.01);
(Continued)

(58) Field of Classification Search
CPC ....... H04L 45/12; H04L 45/124; H04L 43/08; H04L 43/10; H04L 45/02; G08C 23/06;
(Continued)

(56) References Cited

U.S. PATENT DOCUMENTS 4,840,448 A * 6/1989 Thiennot ................ H04B 10/29
                                                    385/20
5,838,477 A * 11/1998 Yamamoto ......... G02B 6/12007
                                                    398/105

(Continued)

FOREIGN PATENT DOCUMENTS

EP        2894820       7/2015
WO   20060132927   12/2006

OTHER PUBLICATIONS

International Search Report dated Mar. 2, 2017 received in counterpart PCT Application No. PCT/US2016/062151.

*Primary Examiner* — Hibret Woldekidan

(57) ABSTRACT

A wet plant manager (WPM) platform is disclosed in accordance with an embodiment of the present disclosure, and supports management of Smart Undersea Network Elements (SUNEs) by providing an abstracted view of the same to higher level network management functions within an optical communication system. The optical communication system can include an optical cable system extending between two or more cable landing stations (CLSs). Each CLS may execute a respective instance of a WPM platform service, with the collective WPM platform performing self-coordination such that only one instance of a WPM service is "active" at any given time. The active WPM service supports a plurality of network topologies architected around SUNEs and "bridges" them such that requests to communicate with a particular SUNE get handled in a transparent manner without the requesters specific knowledge of which command/response (CR) telemetry path was utilized to satisfy the request.

20 Claims, 12 Drawing Sheets

(51) Int. Cl.
*H04B 10/80* (2013.01)
*G08C 23/06* (2006.01)
*H04L 12/751* (2013.01)
*H04Q 11/00* (2006.01)
*H04L 12/26* (2006.01)
*H04L 12/24* (2006.01)

(52) U.S. Cl.
CPC .............. *H04L 43/08* (2013.01); *H04L 43/10* (2013.01); *H04L 45/02* (2013.01); *H04L 45/12* (2013.01); *H04Q 11/0066* (2013.01); *H04Q 2011/0084* (2013.01)

(58) Field of Classification Search
CPC ........ H04B 10/80; H04B 10/29; H04B 13/02; H04B 10/50; H04B 10/038; H04B 10/032; H04Q 11/0066; H04Q 2011/0084; H04Q 2011/0081; H04Q 2011/0052; H04Q 11/0005; H04J 14/0201; H04J 14/021; H04J 14/0287; H04J 14/0271; G02B 6/29383; G02B 6/356
USPC .................. 398/104, 105, 83, 45, 5
See application file for complete search history.

(56) References Cited

U.S. PATENT DOCUMENTS

| | | | | |
|---|---|---|---|---|
| 6,895,187 B1* | 5/2005 | Webb | ................ | H04Q 11/0005 307/126 |
| 7,103,275 B2* | 9/2006 | Fujiwara | ............ | H04B 10/0771 398/173 |
| 7,248,561 B2 | 7/2007 | Ishibashi et al. | | |
| 7,302,192 B2* | 11/2007 | Elahmadi | ........... | H04B 10/2513 398/149 |
| 7,326,916 B2* | 2/2008 | Sugiyama | ............ | H04B 10/032 250/227.14 |
| 7,415,211 B2* | 8/2008 | Feinberg | ............. | H04J 14/0227 396/106 |
| 7,469,104 B2* | 12/2008 | Neubelt | ............... | H04B 10/035 398/10 |
| 7,657,176 B2 | 2/2010 | Yokota et al. | | |
| 7,715,731 B2* | 5/2010 | Elahmadi | ........... | H04B 10/2513 398/188 |
| 8,305,877 B2 | 11/2012 | Sabet et al. | | |
| 8,326,144 B2* | 12/2012 | Yamaguchi | ........ | H04B 10/0795 398/105 |
| 8,401,392 B2* | 3/2013 | Kovsh | ................. | H04J 14/0209 398/2 |
| 8,571,415 B1 | 10/2013 | Rider et al. | | |
| 8,750,707 B2* | 6/2014 | Sabet | ................. | H04B 10/0705 380/263 |
| 8,775,589 B2 | 7/2014 | Liss et al. | | |
| 8,811,149 B2 | 8/2014 | Yabusaki et al. | | |
| 8,934,775 B2* | 1/2015 | Abbott | ................. | H04B 10/038 398/104 |
| 9,203,524 B2* | 12/2015 | Simpson | ................ | H04B 13/02 |
| 9,755,734 B1* | 9/2017 | Vusirikala | ............ | H04B 10/038 |
| 2002/0057477 A1* | 5/2002 | Rocca | ................. | H04J 14/0212 398/104 |
| 2003/0030861 A1* | 2/2003 | Mellert | .............. | H04B 10/0775 398/5 |
| 2003/0031433 A1 | 2/2003 | Feinberg | | |
| 2004/0105136 A1* | 6/2004 | Feinberg | ............. | H04J 14/0227 359/20 |
| 2007/0138417 A1* | 6/2007 | Sugiyama | ............ | H04B 10/032 250/551 |
| 2008/0144513 A1 | 6/2008 | Small et al. | | |
| 2013/0195465 A1* | 8/2013 | Rhodes | ................. | H04B 13/02 398/104 |
| 2014/0103739 A1* | 4/2014 | Takigawa | ............ | H02J 4/00 307/112 |
| 2014/0181292 A1* | 6/2014 | Venkataswami | .... | H04L 41/0677 709/224 |
| 2014/0308036 A1* | 10/2014 | Aida | ........................ | H04B 3/44 398/45 |

* cited by examiner

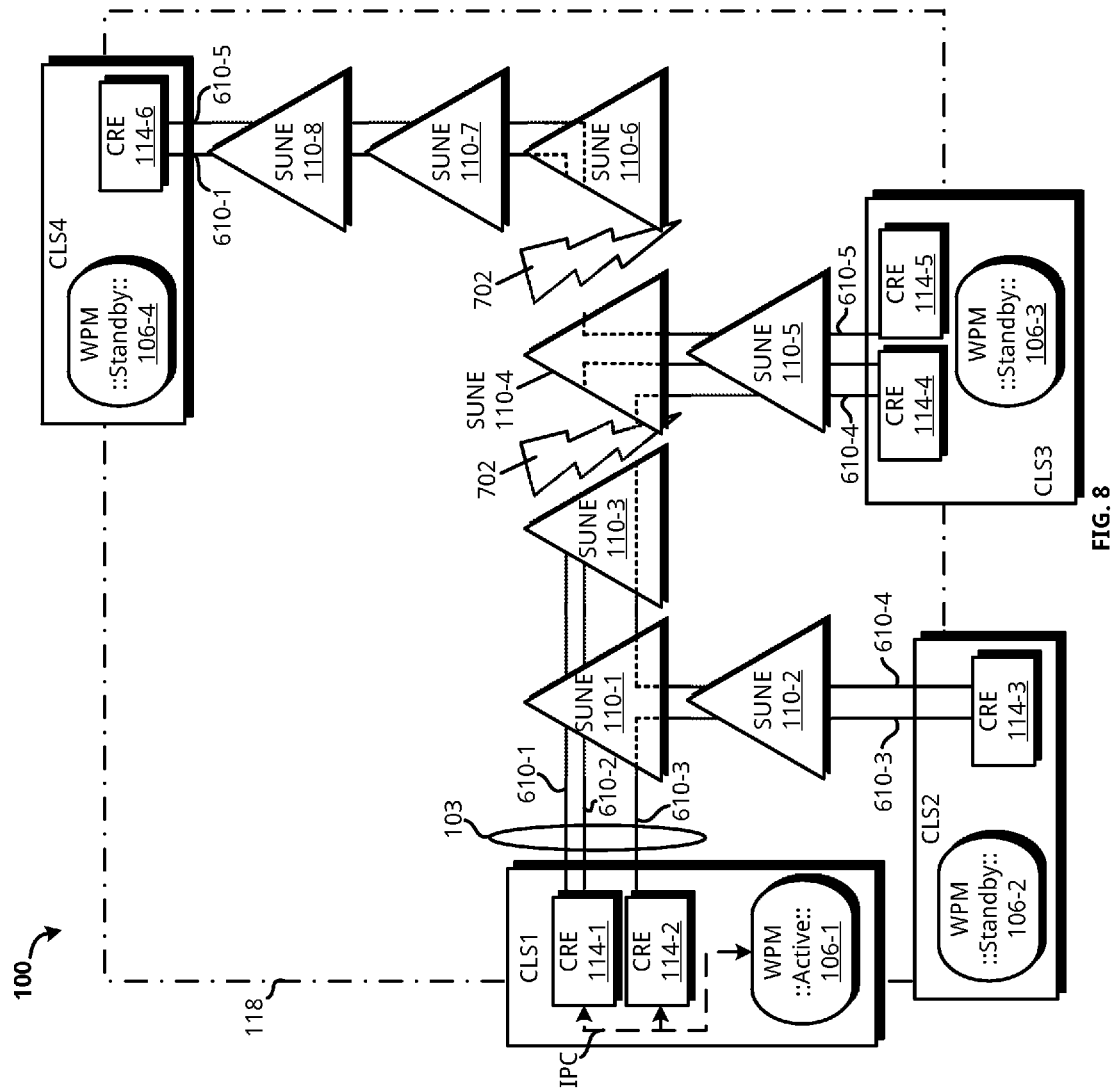

OPTICAL COMMUNICATION SYSTEM WITH DISTRIBUTED WET PLANT MANAGER

TECHNICAL FIELD

The present disclosure relates to optical communication systems and in particular, to an optical communication system with a wet plant manager service configured to facilitate communication with Smart Undersea Network Elements (SUNEs).

BACKGROUND

Network management may be conducted at different levels in various types of networks to avoid network failures, and to assure network performance. In a communication network, an element management system (EMS) may be used to supervise and manage network elements within a network. A communication network may also include a network management system (NMS) to manage the overall network by communicating with several EMSs.

In an undersea optical communication system such as a wavelength division multiplexed (WDM) system, for example, terminal or cable stations may be interconnected by cable segments to form a network. The network elements in an optical communication system may include equipment located at a cable station (e.g., terminal equipment and power feed equipment) as well as equipment connected to the cable station (e.g., repeaters and equalizers). In such a system, an EMS may be located at a cable station (or at a separate location) and used to manage the network elements associated with this cable station. The EMS may include one or more servers for performing the element management functions and one or more workstations for providing a user interface (e.g., to display the information associated with the network elements managed by the EMS). An NMS may be located at one of the cable stations or at a separate location for managing the overall optical communication system or network.

The management of a network may include configuration management, fault management and performance management. An EMS may provide fault management by retrieving, storing and/or displaying alarm, event and system messages forwarded by the network elements managed by the EMS. An EMS may provide performance management by retrieving, storing, displaying and/or measuring transmission quality data. A NMS can provide fault management and performance management for the entire network by managing all of the alarm, event and system messages and the transmission quality data forwarded by each EMS. The NMS may display fault and performance information received from each EMS, e.g. on a network topological map.

BRIEF DESCRIPTION OF THE DRAWINGS

Reference should be made to the following detailed description which should be read in conjunction with the following figures, wherein like numerals represent like parts.

FIG. 8 shows the optical communication system of FIG. 6A with a plurality of cable breaks or other network interruptions along an optical cable system coupled to a plurality of SUNEs, in accordance with an embodiment of the present disclosure.

DETAILED DESCRIPTION

Figure 1:
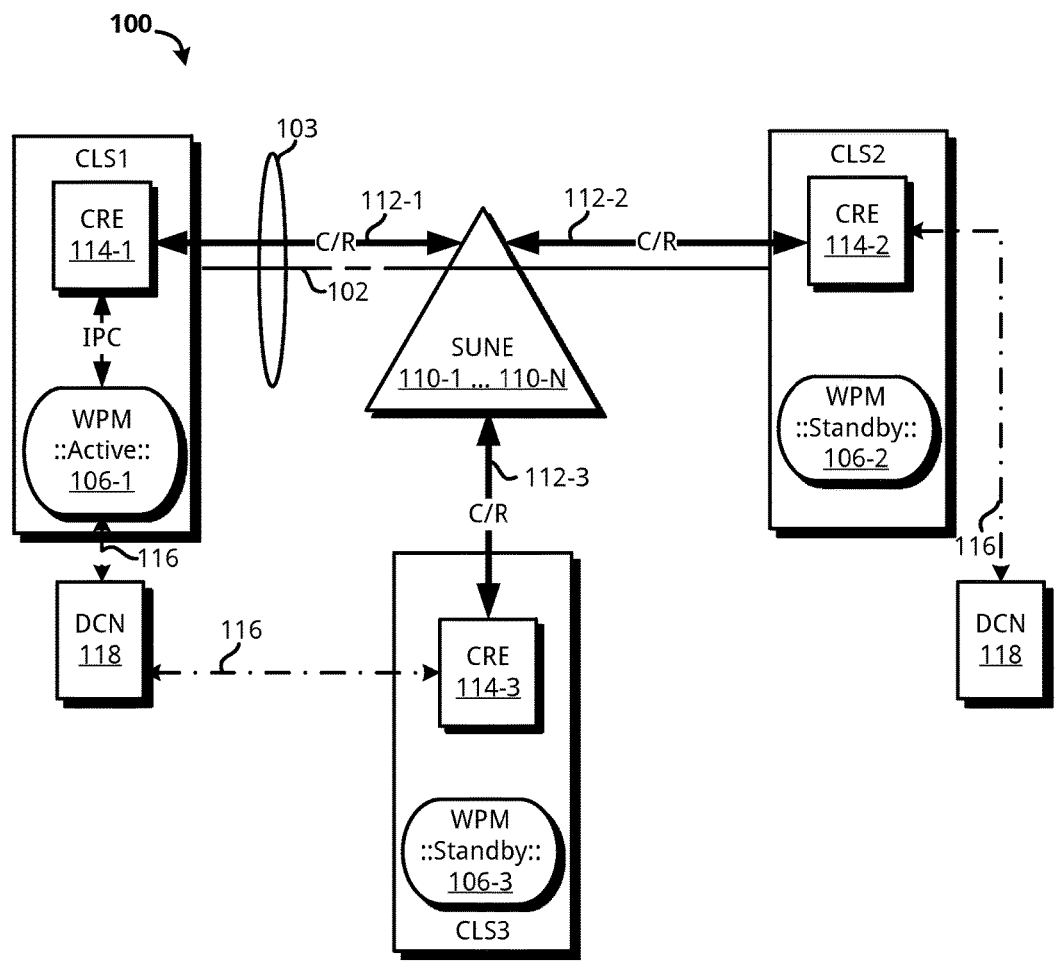
FIG. 1 shows a block diagram illustrating an example optical communication system in accordance with an embodiment of the present disclosure.

A wet plant manager (WPM) platform is disclosed in accordance with an embodiment of the present disclosure, and supports management of Smart Undersea Network Elements (SUNEs) by providing an abstracted view of the same to higher level network management functions within an optical communication system. The optical communication system can include an optical cable system extending between two or more cable landing stations (CLSs), with the optical cable system providing at least one optical cable. Each CLS may execute a respective instance of the WPM platform in the form of a network management application or service, with the collective WPM platform performing self-coordination between cable stations such that only one instance of the network management service is "active" at any given time. The active network management service is herein referred to as the active WPM service. The active WPM service supports a plurality of network topologies architected around SUNEs and "bridges" them such that requests to communicate (e.g., sending and receiving optical signals) with a particular SUNE get handled in a transparent manner without the requesters specific knowledge of which Command/Response (CR) telemetry path or network was utilized to satisfy the request. In addition, the active WPM service allows SUNEs to propagate events to the optical communication system in order to provide up-to-date notification of network topology changes, measurements and faults, for example. In turn, the optical communication system may include a network management service (NMS) that receives the SUNE events and displays a visual representation of changes to network topology to a user. Thus the WPM platform may enable a wide-range of high-level network management functions by the NMS including automated fault-recovery schemes, dynamic transmission trail (path) topologies through reconfiguration of SUNEs, provisioning of capacity allocation plans (CAPs) via adjustments to optical add/drop multiplexer (OADM) assignments, and remotely-initiated SUNE firmware updates. In turn, the optical communication system may include a network management service (NMS) that receives the SUNE events and displays a visual representation of changes to network topology to a user. Thus the WPM platform may enable a wide-range of high-level network management functions by the NMS including automated fault-recovery schemes, dynamic transmission trail (path) topologies through reconfiguration of SUNEs, provisioning of capacity allocation plans (CAPs) via adjustments to optical add/drop multiplexer (OADM) assignments, and remotely-initiated SUNE firmware updates.

SUNEs may generally include any undersea element that facilitates optical communication along the cable system between CLSs, and is configured with software and/or hardware that can service management requests from the WPM platform. To this end, an undersea element may be accurately described as a "smart" undersea element when that undersea element includes the ability to be remotely managed by the WPM platform. Remote management functions may include, for example, diagnostics, monitoring, provisioning/re-provisioning, and execution of one or more commands by a given SUNE. In addition, the remote management functions implemented by a SUNE may also facilitate the high-level network management functions provided by the WPM platform, as discussed above. In an embodiment, SUNEs use a Command/Response management approach to receive and execute commands originating from the WPM platform. Some example SUNE types include optical add/drop branching units (BUs), power feed BUs, and intelligent repeaters/amplifiers, although other types of undersea elements are also within the scope of this disclosure.

Glossary of Acronyms

The following glossary of acronyms is provided for purpose of reference:
BU Branching Unit
CAP Capacity Allocation Plan
CLS Cable Landing Station
CORBA Common Object Request Broker Architecture
CR Command/Response
CRC Cyclic Redundancy Check
CRE Command/Response Equipment
DCN Data Communications Network
EMS Element Management System
GUI Graphical User Interface
HTTP Hypertext Transfer Protocol
IPC Inter-Process Communication
ITU International Telecommunication Union
LME Line Monitoring Equipment
NML Network Management Layer
NMS Network Management System
NOC Network Operations Center
OADM Optical Add/Drop Multiplexer
OCh Optical Channel
ODU Optical Data Unit
OMS Optical Multiplex Section
OPU Optical Channel Payload Unit
OTN Optical Transport Network
OTS Optical Transport Section
OTU Optical Transport Unit
PFE Power Feed Equipment
SLTE Submarine Lightwave Termination Equipment
SNMP Simple Network Management Protocol
SUNE Smart Undersea Network Element
VoIP Voice Over IP
WDM Wavelength Division Multiplexing
WPAP Wet Plant Access Points
WPM Wet Plant Manager General Overview As previously discussed, an NMS may display fault and performance information received from each EMS using, for example, a network topological map. While this fault and performance information provides an indication of overall network health and performance, the undersea or "wet" elements themselves remain largely inaccessible for the purpose of control, reconfiguration and upgrades. This is because undersea elements may pose a challenge to fix in the event of a misconfiguration because of their physically remote locations and their depth below sea level. For example, data errors introduced during remote management may "brick" the undersea element. That is, any misconfiguration/data fault may result in the undersea element ceasing to operate, and in some cases, this may also result in an interruption in communication across an optical communication system similar to a cable cut. Such interruptions may be expensive and require a ship or other service vessel to be dispatched to make repairs. Some approaches seek to provide at least some remote management function of undersea elements. These approaches may include modifying element-specific configuration files that must be accurately seeded, followed by a user-initiated network management function restart. However, the response time for such approaches may cause an unacceptable amount of downtime, and the modification and transmission of element-specific configuration files may increase the risk of data errors.

Thus, in accordance with an embodiment of the present disclosure, a WPM platform is disclosed that can provide remote management of SUNEs in a transparent and reliable manner such that an NMS may perform high-level management functions via an active WPM service, which in turn, uses a nominally shortest or otherwise least error prone data telemetry path to a given SUNE. As generally referred to herein, the term reliable in the context of a data telemetry path may refer to data telemetry paths with a relatively low bit error rate, or below an average bit error rate for a plurality of data telemetry paths in a given undersea optical cable system. Alternatively, or in addition to bit error rates, other considerations may also factor into data telemetry path reliability. Some non-limiting examples include those paths with a relatively low number of packet re-transmissions, and packet transmission delays. A nominally shortest telemetry path may refer to a telemetry path with the least optical cable distance between two points, or a telemetry path between two points with the least number of "hops" (e.g., repeaters, attenuators, amplifiers), or both.

In an embodiment, the active WPM service determines a nominally shortest or otherwise least error prone data telemetry path at least in part by examining a network topology map that associates Command/Response Equipment (CRE) with each SUNE based on, for example, shared optical fiber pairs (or channels). The active WPM service may update the network topology based on real-time or near real-time notifications from SUNEs. Thus the active WPM service may select a particular CRE based on up-to-date network topologies. Moreover, an NMS may receive the same or substantially similar notifications from SUNEs through the active WPM service and use the same to dynamically update network and performance information provided to a user. In some cases, the NMS includes both smart and non-smart undersea managed elements, with information pertaining to both presented to a user via, for example, a visualized network topology map.

Thus, and in an embodiment, the WPM platform provides coordinated communication with SUNEs via multiple CREs located in cable landing stations (CLSs). To this end, CREs may accurately be referred to as a wet plant access points (WPAPs), as each may be configured to translate requests from the WPM platform into low-level commands sent to target SUNEs via associated Command/Response (CR) telemetry paths. The WPM platform may comprise a reusable software platform that supports management such as fault diagnosis and recovery, performance and measurements, configuration, provisioning and security of SUNEs. The WPM platform may operate as a logical network management application within each CLS, and may conduct inter-cable station coordination via a data communications network (DCN) to ensure that only one instance of a WPM service is "active" at any given time. The WPM platform may select a CLS, and more particularly a NMS server or workstation within a CLS, as the host of the "active" WPM service based on the CLS having reliable and efficient communication with other CLSs. For example, a particular CLS may be selected to execute the "active" WPM based on a CLS having a the overall best connectivity to other cable stations taking into account, for example, distance and quality of service from a DCN point of view. In addition, the WPM platform may minimize or otherwise mitigate command response collisions as only one WPM service (e.g., the active WPM service) and only one CRE get used at any given time to communicate with a particular SUNE. The WPM platform may reduce communication overhead related to the SUNEs while ensuring that management functions within the DCN can access and manage SUNEs in accordance with applied security policies.

While examples and scenarios provided herein are directed to an optical communication system having services such as a WPM service, the term "service" is not necessarily limited to just a computer application or software service. The term "service" as generally referred to herein may also refer to specialized computer servers having specialized hardware or software, or both. In some cases, a single computer server (e.g., an NMS computer server) may execute all services in a given CLS. In other cases each CLS may include, for example, an equipment rack housing N number of servers with each server configured to perform a different task (e.g., an NMS server, a WPM server, and so on).

The expressions "optically communicates" and "optically coupled" as used herein refer to any connection, coupling, link or the like by which optical signals carried by one optical system element are imparted to the "communicating" or "coupled" element. Such "optically communicating" or "optically coupled" devices are not necessarily directly connected to one another and may be separated by intermediate optical components or devices. Likewise, the terms "connected" or "coupled" as used herein in regard to physical connections or couplings is a relative term and does not require a direct physical connection.

The term "coupled" as used herein refers to any connection, coupling, link or the like by which signals carried by one system element are imparted to the "coupled" element. Such "coupled" devices, or signals and devices, are not necessarily directly connected to one another and may be separated by intermediate components or devices that may manipulate or modify such signals. Likewise, the terms "connected" or "coupled" as used herein in regard to mechanical or physical connections or couplings is a relative term and does not require a direct physical connection.

As used herein, use of the term "nominal" or "nominally" when referring to an amount means a designated or theoretical amount that may vary from the actual amount.

Example Optical Communication System

Now turning to the Figures, FIG. 1 illustrates one example of an optical communication system 100 in accordance with an embodiment of the present disclosure. As shown, the optical communication system 100 includes cable landing station CLS1, CLS2 and CLS3 coupled to one or more Smart Undersea Network Elements (SUNEs) 110-1 . . . 110-N by way of optical cable system extending along trunk path 102 in an optical cable 103. As should be appreciated, the optical communication system 100 is illustrated in a highly simplified form for clarity and practicality, and numerous other optical components and configurations are within the scope of this disclosure. For instance, the optical cable 103 may comprise multiple cable segments, with each cable segment including one or more optical fiber pairs coupled to one or more SUNEs, or other optical components without so-called "smart" capabilities such as standard amplifiers, repeaters, etc. In addition, the optical communication system 100 can include N number of cable landing stations and is not limited to just three (3) as illustrated in FIG. 1.

Within the context of the example embodiment of FIG. 1, the SUNEs 110-1 . . . 110-N represent one or more wet plant components coupled to one or more fiber pairs of the optical cable 103. Some example wet plant components may include optical amplifiers, repeaters, branching units (BUs), BUs with optical add/drop multiplexers (OADM), and power feed BUs. The optical cable 103 may span a body of water, such as an ocean. When used to span a body of water, the SUNEs 110-1 . . . 110-N may reside on the ocean floor, and the optical cable 103 may span between cable landing stations CSL1 and CLS2 positioned on-land at, for example, beach landings. On the other hand, cable landing station CLS3 may reside on-land (such as a beach landing) or at sea on an oil or drilling platform, or any other man-made structure that may support or otherwise participate in optical communications.

The SUNEs 110-1 . . . 110-N may implement or otherwise support transmitting data via a standard transport data model such as the G.709 standard titled "Interfaces for the optical transport network", adopted and published on Dec. 13, 2012 by the International Telecommunication Union (ITU). To this end, the optical communication system 100 may be accurately described as providing an optical transport network (OTN). Within the ITU G.709 standard, an optical transport network (OTN) may implement a hierarchy of abstracted layers, such as optical transport section (OTS), an optical multiplex section (OMS), an optical channel (OCh), an optical transport unit (OTU), an optical data unit (ODU), and an optical channel payload unit (OPU). In a general sense, these layers allow underlying optical components of the optical communication system 100 to be abstracted, and allow communication trails to be dynamically formed, destroyed and re-routed. For example, SUNEs that include optical add/drop multiplexing (OADM) capability and may dynamically adjust channel allocation based on feedback and control messages from a network management system (NMS), as discussed in greater detail below.

As generally referred to herein, transmission trails generally refer to one or more connections formed using managed elements of the optical communication system 100 (e.g., the SUNEs 110-1 . . . 110-N), and at least one termination point. For example, in the example optical communication system 100 of FIG. 1, the trunk path 102 may provide one or more transmission trails that extend from CLS1 through SUNE 110-1 . . . 110-N and ends at CLS2, or at CLS3. These transmission trails may be supported by N number of optical channels provided by wavelength-division multiplexing (WDM), for example. Special transmission equipment, generally referred to as Submarine Lightwave Termination Equipment (SLTE) within the cable landing stations, and maybe coupled to a data communication network 118 to use the transmission trails to communicate (e.g., send and receive optical signals) with other systems/components coupled to the trunk path 102, or any system communicatively coupled to the communication system 100 by way of a data communications network (DCN) 118, for example.

Note the optical communication system 100 may include N number of transmission trails through N number of fiber pairs, with those fiber pairs passing through N number of managed elements such as SUNE 110-1 . . . 110-N. Thus, multiple alternate transmission trails may be provided to route data communications to a same termination point.

The trunk path 102 may include one or more optical fiber pairs within the optical cable 103, and allow for bi-directional communication between the cable landing stations CLS1, CLS2 and CLS3. The cable landing stations CLS1, CLS2 and CLS3 may include known optical equipment for sending and receiving WDM optical signals to/from the trunk path 102. In addition, and as shown, the cable landing stations CLS1, CLS2 and CLS3 may include CREs 114-1 . . . 114-2, and wet plant manager (WPM) services 106-1 . . . 106-3.

Each CRE 114-1 . . . 114-3 or WPAP may include, for example, optical components (e.g., optical transceivers), hardware, software, or any combination thereof that allows for communication with one or more of the SUNEs 110-1 . . . 110-N. This communication may be over respective bi-directional command/response (CR) telemetry paths 112-1 . . . 112-3 terminating between cable stations and coupled to one or more the SUNEs 110-1 . . . 110-N. The relationship between the CREs 114-1 . . . 114-3 and the SUNEs 110-1 . . . 110-N may be N:M whereby any number of CREs may communicate (e.g., send and receive optical signals) with any number of SUNEs, and vice-versa. Such communication is illustrated logically as CR telemetry paths 112-1 . . . 112-3 extending between cable stations CLS1, CLS2 and CLS3 and SUNE 110-1 . . . 110-N, but may be physically manifested by one or more optical fiber pairs (or optical channels thereof) in fiber cable 103. Each one of CR telemetry paths 112-1 . . . 112-3 may include a dedicated optical channel or frequency within the trunk path 102, although CR telemetry paths 112-1 . . . 112-3 may operate on non-dedicated optical channels, or a mix of both.

In any event, each WPM service 106-1 . . . 106-3 may utilize one or more of the CREs 114-1 . . . 114-3 to access one or more of the SUNEs 110-1 . . . 110-N for fault monitoring, performance monitoring, configuration, provisioning, and security management. Each WPM service 106-1 . . . 106-3 may include a plurality of machine-readable instructions that when executed by at least one processor cause a WPM process to be carried out. One example computer system configured to execute an instance of a WPM service, and other various services (e.g., NMS services) is shown in FIG. 10. The machine-readable instructions may include compiled or otherwise interpreted machine code based on, for example, C++, Java, or other suitable programming language. Some example WPM processes are discussed below with reference to the methods of FIGS. 6B and 9A. In some cases, a physical network manager server (not shown) at each of cable stations CLS1, CLS2 and CLS3 instantiates/executes a local instance of WPM service 106-1 . . . 106-3 respectively.

Each WPM service 106-1 . . . 106-3 operates in essentially one of two operational states/modes: standby (inactive) and active. The optical communication system 100 seeks to have a single instance of a WPM service in the active state, with the others in standby to avoid conflicts arising from two or more WPM services accessing the same CRE at the same time. To ensure this, the presently active WPM service (e.g., WPM service 106-1) may broadcast or otherwise direct a heartbeat message to the other WPM services (e.g., WPM service 106-2 and 106-3). After receiving the heartbeat message, WPM services 106-2 and 106-3 may continue to operate in standby such that they do not initiate communication with the CREs 114-1 . . . 114-3. On the other hand, the lack of heartbeat messages over a predefined period of time may trigger a timeout causing one of WPM services 106-2 or 106-3 to transition from standby to active. The particular WPM service that transitions to active may automatically do so based on, for instance, a voting scheme, a priority scheme whereby a given WPM service only transitions to active if all other higher-priority WPM services fail to transmit a heartbeat, or through manual user input.

Each WPM service 106-1 . . . 106-3 may use inter-process communication (IPC) to communicate with a particular one of the CRE 114-1 . . . 114-3. IPC communication may occur over a data communications network (DCN) 118 provided via an off-cable communications path 116 or network, or via an on-cable communications path or network through trunk path 102, or both. In the event a WPM service seeks to interact with a local CRE (e.g., physically co-located in the same cable landing station), the IPC communication may occur via, for example, a local Ethernet network or other suitable communication network. In the event the active WPM service seeks to interact with a remote CRE (e.g., physically located in a different cable landing station), the active WPM service may use the DCN 118 provided over the trunk path 102 or via the off-cable communications path 116.

The WPM services 106-1 . . . 106-3 can provide coordinated communication with the SUNEs 110-1 . . . 110-N through the CREs 114-1 . . . 114-3, and may be collectively referred to as a WPM platform. As will be discussed below, the WPM platform provides a logical management scheme for each of the SUNEs 110-1 . . . 110-N, and can determine the nominally shortest or otherwise list error prone telemetry path (e.g., CR telemetry path 112-1 to 112-3) to use when accessing a given SUNE. In operation, the optical communication system 100 dynamically updates network topologies, with those changes being propagated to a network management system (NMS) in generally real-time. The WPM platform may utilize the real-time network topology changes to ensure the nominally shortest or otherwise least error prone telemetry path gets utilized. Thus the WPM platform may provide fault recovery, dynamic transmission trail topologies, and support the provisioning of capacity allocation plans and firmware downloads to the SUNE 110-1 . . . 110-N. In addition, the WPM platform may reduce communication overhead to the SUNEs 110-1 . . . 110-N while ensuring that any management entity within the optical communication system 100 can access and manage the SUNEs 110-1 . . . 110-N in a manner that comports with applied security policies.

Figure 2:
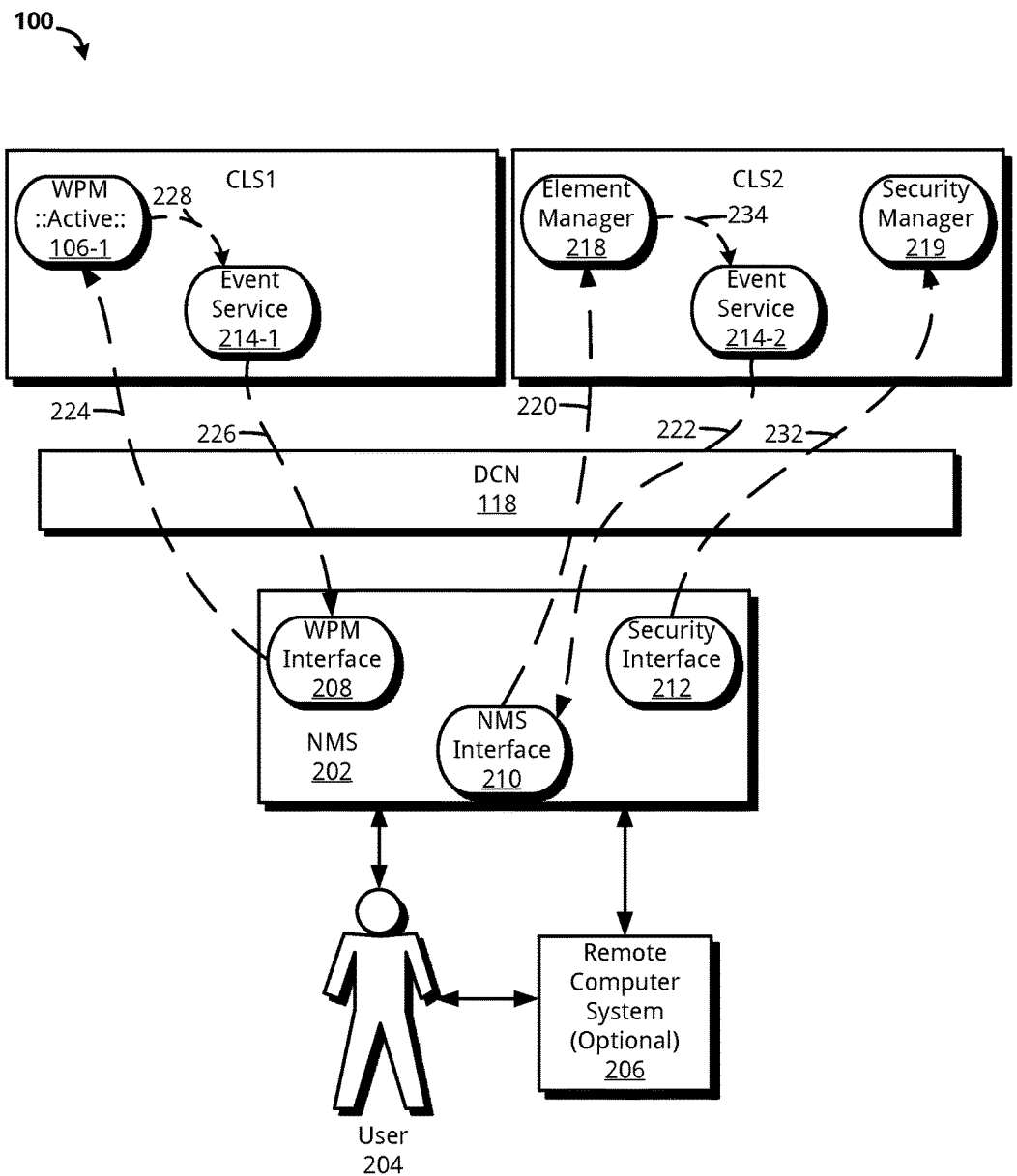
FIG. 2 shows an example process flow of the undersea optical communication system of FIG. 1 and includes a network management system (NMS) operating in concert with an active wet plant manager (WPM) service to maintain an up-to-date network topology, in accordance with an embodiment of the present disclosure.

Now referring to FIG. 2, with additional reference to FIG. 1, a block diagram illustrates a process flow between a network management system (NMS) 202 and an active WPM service 106-1, in accordance with an embodiment of the present disclosure. The NMS 202 may comprise one or more computer systems configured with applications/services designed to perform network management of the optical communication system 100. In some cases the NMS 202 comprises two or more computer systems within, for example, two or more cable landing stations.

The NMS 202 may include one or more graphical user interfaces (GUIs) designed to allow a user, such as user 204, to directly interact with the associated network management services and perform network management functions. Alternatively, or in addition to providing GUIs, the NMS 202 may provide a remote interface such as a web service, web server (e.g., a hypertext transfer protocol (HTTP) server), or other suitable communication interface that allows remote operate of the NMS 202. Each of these aspects of the optical communication system 100 will now be discussed in greater detail.

The network management server may perform a wide range of functions including continuous long-haul network monitoring, fault detection (e.g., a cable cut or power feed equipment (PFE) failure), proactive maintenance (e.g., firmware upgrades for optical components), alarm management (e.g., from the SUNEs 110-1 . . . 110-N), network topology management (e.g., topology discovery, traffic re-routing, capacity-allocation plans), just to name a few.

As shown, the user 204 may access the NMS 202 directly, or through a remote computer system 206. The remote computer system 206 may be a laptop, a smart phone, or any other computing device, such as the computing system 1000 shown in FIG. 10. In some cases, the NMS 202 is a workstation computer co-located in a cable landing station (e.g., CLS1) with the active WPM service (e.g., 106-1). In other cases, the NMS 202 is a workstation located in a cable landing station (e.g., CLS2) which is remote to the active WPM service (e.g., WPM 106-1) or in a remote Network Operations Center (NOC). In any event, and as shown, the NMS 202 communicates bi-directionally with the active WPM service 106-1 using IPC via the DCN 118 to provide users with accurate up-to-date topology representations that may include transmission trails through managed elements of the optical communication system 100 including the SUNEs 110-1 . . . 110-N.

As shown in FIG. 2, the user 204 may communicate with the active WPM service 106-1 through a WPM interface 208. The WPM interface 208 may include one or more graphical user interfaces (GUIs) configured to visualize and interact with the active WPM service 106-1. The user 204 may also interact with and perform network management operations via the NMS interface 210. The NMS interface 210 may include one or more GUIs configured to visualize and interact with both local NMS functions provided by the NMS 202 and the NMS functions located remotely in cable landing stations, such as CLS2.

For example, the NMS interface 210 may request the current topology for the optical communication system 100 by transmitting a "get topology" request 220 to the element manager 218. In addition, the NMS interface 210 may "subscribe" to topology changes via the element manager 218. The element manager 218 may monitor non-WPM devices or so-called "dry" devices such as land-based networking equipment, dry reconfigurable optical add/drop multiplexers (ROADMs) CREs, line cards, PFEs, line monitoring equipment (LME) via, for instance, Simple Network Management Protocol (SNMP) messages. Topology change events 234 detected by the element manager 218 may get provided to the event service 214-2, and in turn, the event service 214-2 may provide an abstracted event 222 to the NMS interface 210.

On the other hand, the WPM interface 208 may interact with the active WPM service 106-1 to receive current SUNE configurations via IPC channel 224. The active WPM service 106-1 may receive WPM events 228 from the SUNEs 110-1 . . . 110-N and provide the same to the event service 214-1. The WPM interface 208 may "subscribe" and receive those WPM events 228 through dedicated WPM event channel 226. The WPM events 228 may represent real-time updates to transmission trails through managed elements such as the SUNEs 110-1 . . . 110-N. For instance, the WPM events 228 may include SUNE configuration change notifications such as notifications of changes regarding OADM add/drop arrangements. In other cases, the WPM events 228 may include alarm notifications and other fault indicators when, for example, a measurement exceeds a predefined threshold. The user 204 may manually cause such changes to occur, or a fault recovery process (not shown) within the NMS 202 may cause such notifications by modifying one or more transmission trails. However, since the active WPM service 106-1 receives notice of SUNE changes, the active WPM service 106-1 may abstract the WPM events 228 into new/updated trail routes and provide the same to a network management layer of the optical communication system 100, which is discussed in further detail below with regard to FIG. 3. In addition, the active WPM service 106-1 may also provide alarm events and historical performance measurements for the SUNEs 110-1 . . . 110-N.

The event service 214-1 and 214-2 may implement the common object request broker architecture (CORBA), or any other architecture suitable for facilitating communication between systems of potentially different operating systems, programming languages, and computing hardware. The communication between event service 214-1 and 214-2 may be method calls via CORBA-compliant clients within, for example, the WPM interface 208 or the NMS interface 208, or both. In any event, each event service 214-1 and 214-2 may store received events in a non-volatile memory such as a database or flat-file on a hard drive.

A security interface 212 may authorize and allow the aforementioned WPM/non-WPM operations to be initiated and to restrict access to various NMS/WPM functionality based on a security policy located within the security manager 219. The security interface 212 may request and retrieve a particular security policy for user 204 based on transmitting a login message 232 to the security manager 219. In addition, the security interface 212 may include one or more GUIs, such as a login prompt to ensure the user 204 is properly authenticated prior to allowing the user 204 to access the NMS 202.

Figure 3:
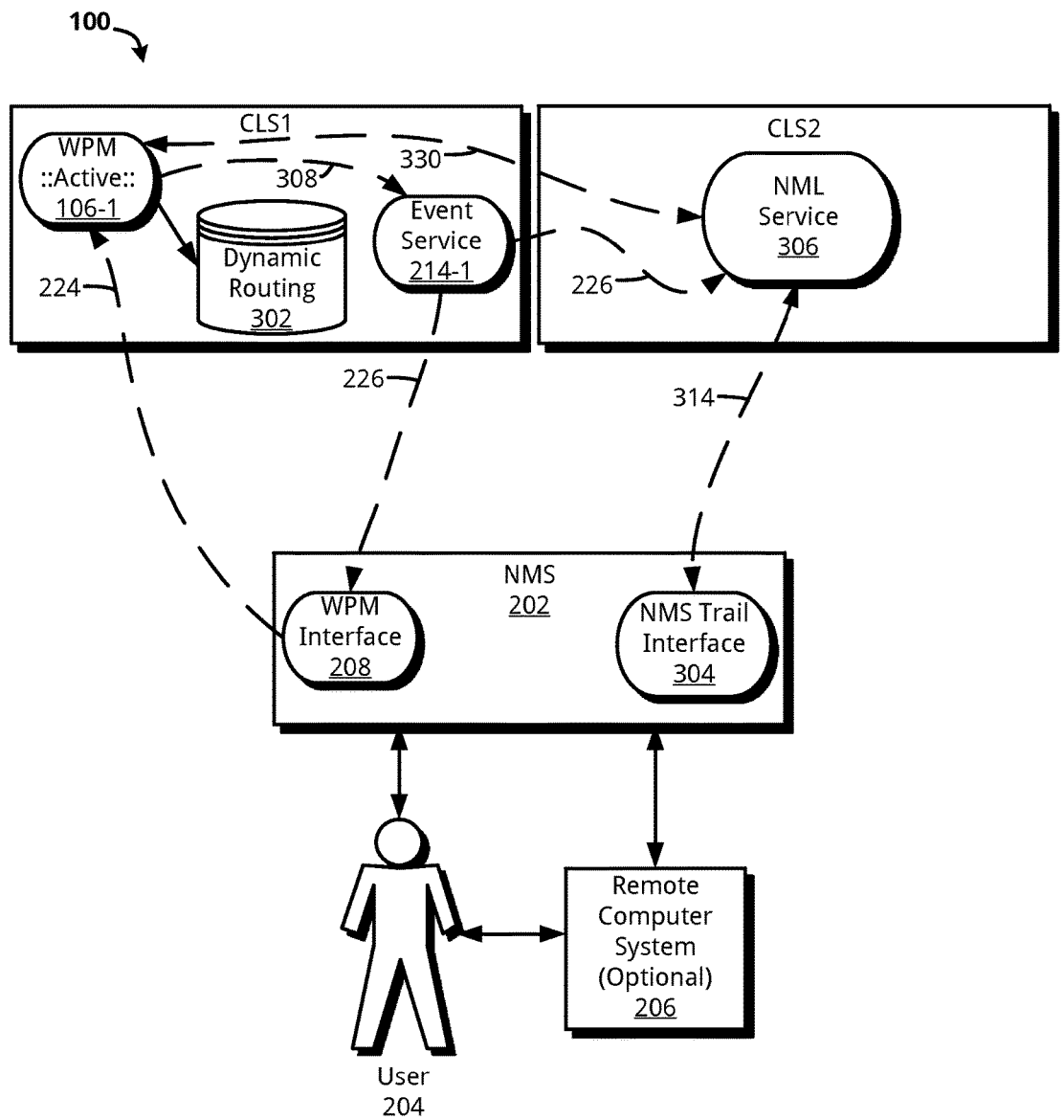
FIG. 3 shows another example process flow of the optical communication system of FIG. 1 and includes an active WPM service dynamically updating a network management layer (NML) service of the NMS based on notifications from Smart Undersea Network Elements (SUNEs), in accordance with an embodiment of the present disclosure.

The NMS 202 may thus use data provided by both the WPM interface 208 and the NMS interface 210 to abstractly provide new transmission trail routes to a NML service 306 (FIG. 3). A user 204 may receive real-time or otherwise up-to-date topology indicators/visual representations that include transmission trails through managed elements of the optical communication system 100 including the SUNEs 110-1 . . . 110-N.

FIG. 3 shows a block diagram that illustrates one example process flow between an active WPM service 106-1 and a NML service 306 of the optical communication system 100, in accordance with an embodiment of the present disclosure. The NML service 306 may manage a memory (not shown) that stores a plurality of transmission trails for the optical communication system 100.

The active WPM service 106-1 may store a plurality of SUNE configurations, such as the present OADM assignments and other SUNE-specific configuration parameters in the dynamic routing database 302. The dynamic routing database 302 may get stored on in a memory (not shown) local to the active WPM service 106-1 (e.g., share the same computer hardware), or may get stored in a remote memory accessible via IPC, for example. In an embodiment, changes to the dynamic routing database 302 automatically replicate to other CLSs such that they also include an up-to-date copy of the dynamic routing database 302.

The NML service 306 may store a plurality of transmission trails in a memory (not shown). The NML service 306 may be executed locally to an active WPM service, or remotely, as is shown in FIG. 3. In any event, the NML service may service requests to query existing transmission trails (e.g., get topology request 220 of FIG. 2) by the user 204. The NMS trail interface 304 of the NMS 202 allows the user 204, or other NMS processes of the NMS 202, to transmit NML query messages 314 to the NML service 306.

As shown, the NML service 306 gets notified by the event service 214-1 when changes to the SUNEs 110-1 . . . 110-N occur through one or more WPM event messages 228. In response, the NML service 306 may request SUNE changes from the active WPM service 106-1 via one or more SUNE configuration request messages 330. In response, the active WPM service 106-1 may transmit the SUNE configuration changes to the NML service 306. In some cases, the active WPM service 106-1 may communicate (e.g., send and receive optical signals) with a particular SUNE to acquire those changes, or may provide those changes from a memory (e.g., from the dynamic routing database 302). In turn, the NMS 202 may also receive notification of those changes via the NMS trail interface 304, and use the same, for example, to update a visual representation of real-time network topology using, for example, GUIs provided by the NMS interface 210.

Figure 4:
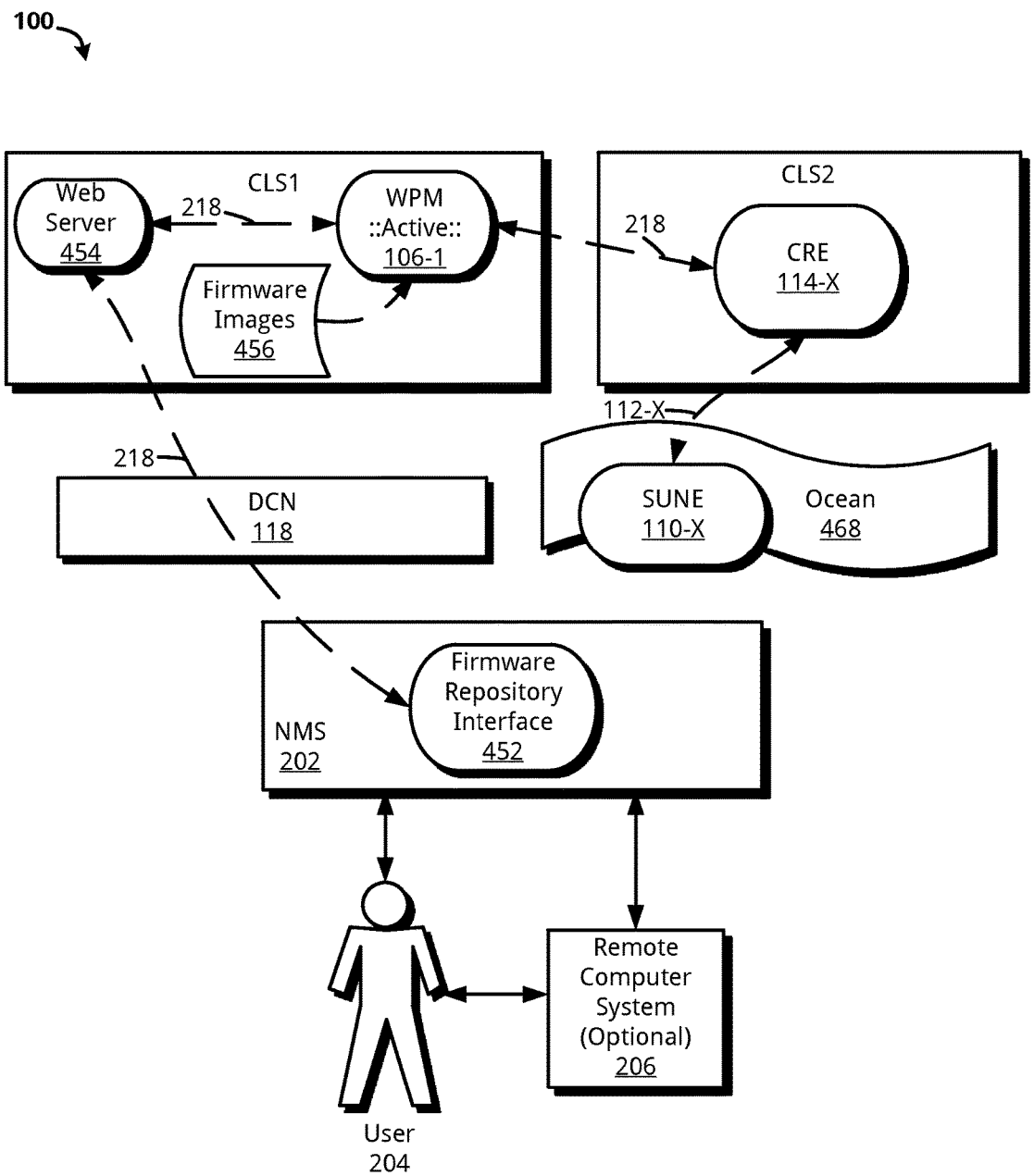
FIG. 4 shows another example process flow of the optical communication system of FIG. 1 and includes an active WPM service causing a SUNE to download and apply a firmware update, in accordance with an embodiment of the present disclosure.

Now referring to FIG. 4, with additional reference to FIGS. 1 and 2, a block diagram illustrates a process flow for updating firmware of a SUNE using the optical communication system 100, in accordance with an embodiment of the present disclosure. The optical communication system 100 may upgrade SUNEs such as the SUNEs 110-1 . . . 110-N for maintenance, bug fixes, and feature upgrades, for example.

The user 204 may access the firmware repository interface 452 within the NMS 202 via the remote computer system 206, or directly (e.g., by accessing the workstation housing the NMS 202). The firmware repository interface 452 may include one or more GUIs configured to cause the NMS 202 to send requests to the webserver 454 via DCN 118 for a list of system-wide managed SUNEs and associated firmware versions.

The webserver 454 may be any server capable of servicing hypertext transfer protocol (HTTP) requests. For example, the webserver 454 may include a computer system with an Apache Webserver instance executed thereon, although other HTTP servers are also within the scope of this disclosure. In any event, the webserver 454 may receive requests for system-wide managed SUNEs and associated firmware versions. In turn, the webserver 454 may access a file, database, or other suitable volatile or non-volatile memory configured to store a list of managed SUNE identifiers and associated firmware versions. In some cases, each managed SUNE identifier may be associated with a particular optical fiber pair and optical channel (or wavelength) each particular SUNE is configured to communicate on, although other addressing schemes are also within the scope of this disclosure. The webserver 454 may then send the retrieved list of managed SUNE identifiers and associated firmware versions to the user 204 through the NMS. Note that the associated firmware versions may include at least a currently applied firmware version, and may also include one or more firmware versions that are compatible and may be applied.

The NMS may display the retrieved list of managed SUNE identifiers and associated firmware versions via a GUI provided by the firmware repository interface 452, or simply send the retrieved list to the remote computer system 206, depending on a desired configuration.

The user 204 may select a particular SUNE from the displayed or otherwise provided list of managed SUNE identifiers, and a compatible firmware version to be applied to the SUNE. The NMS 202 may receive the selected managed SUNE identifier and compatible firmware version and send the same to the web server 454 within a request. In turn, the web server 454 may send the request to the active WPM service 106-1, which in turn sends the request to the CRE 114-X.

In turn, the CRE 114-X receives the request and communicates with the SUNE 110-X via the CR telemetry path 112-X. Communication may include the CRE 114-X sending and receiving one or more optical signals with the SUNE 110-X. As shown, SUNE 110-X resides on the bottom of the ocean 468 or otherwise off-shore along the trunk path 102. In some cases, the one or more signals cause the SUNE 110-X to download a firmware image from the active WPM service 106-1 through the CRE 114-X. This may include the active WPM service retrieving the firmware image from the firmware images repository 456 and providing the retrieved firmware image to the SUNE 110-X via the CRE 114-X. The firmware image repository 456 may include a volatile or non-volatile memory configured to store firmware images.

Figure 5:
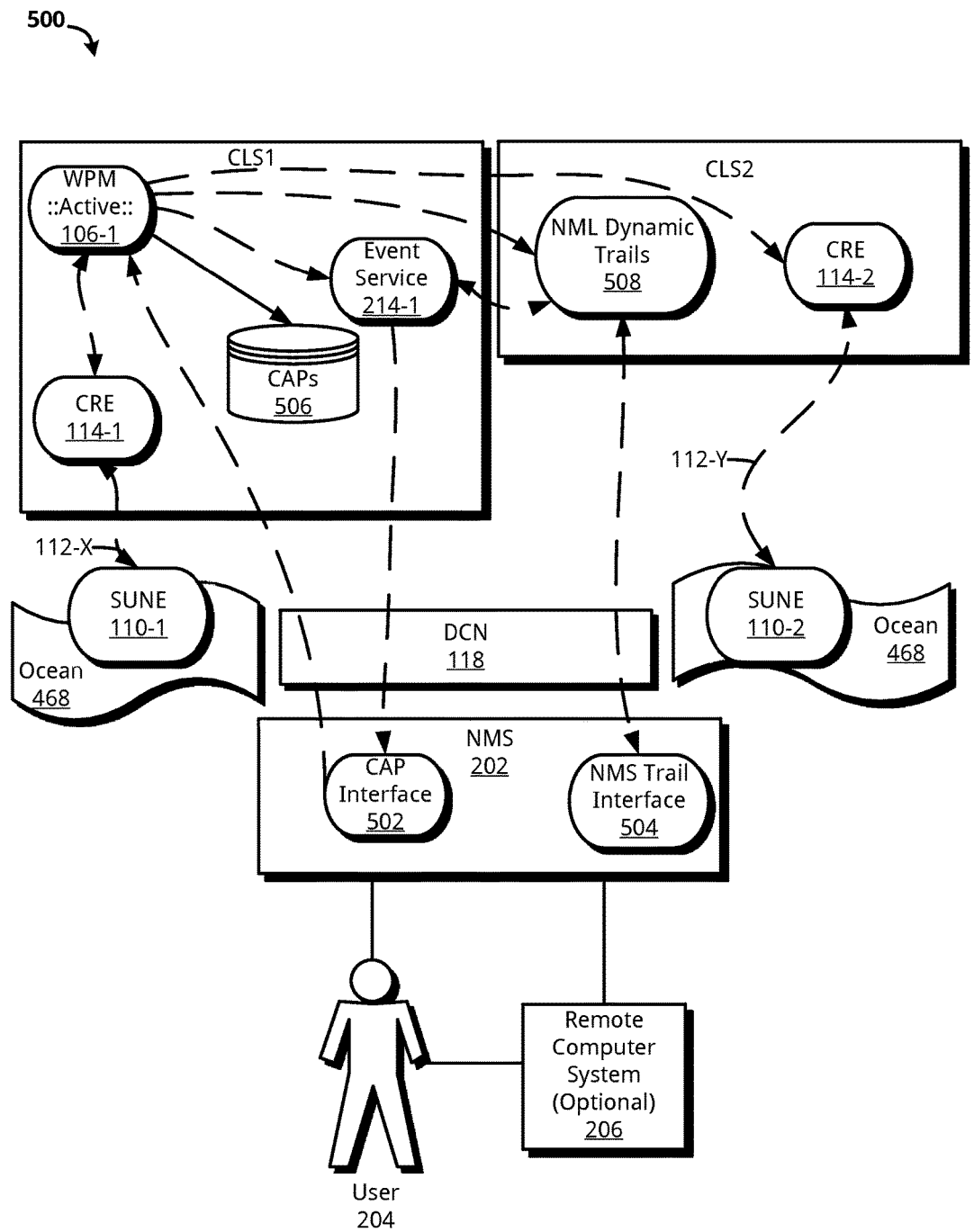
FIG. 5 shows another example process flow of the optical communication system of FIG. 1 and includes an active WPM service selectively applying a capacity allocation plan (CAP) to a plurality of SUNEs, in accordance with an embodiment of the present disclosure.

Now referring to FIG. 5, one example process flow shows how the optical communication system 100 selects a particular CRE to communicate with a plurality of SUNEs, in accordance with an embodiment of the present disclosure. As shown, the example optical communication system 100 includes a plurality including SUNEs 110-1 and 110-2. Each of the SUNEs 110-1 and 110-2 may be coupled to CR telemetry paths 112-X and 112-Y, respectively. In some cases, CR telemetry paths 112-X and 112-Y are the same CR telemetry path, that is, they may be the same optical fiber pair. In other cases, CR telemetry paths 112-X and 112-Y are different CR telemetry paths and, for example, are provided via different optical fiber pairs.

In the example embodiment of FIG. 5, the SUNEs 110-1 and 110-2 may include OADM capabilities and provide at least one transmission trail along the trunk path 102 (FIG. 1). To this end, each SUNEs 110-1 and 110-2 may include a particular OADM configuration that represents a particular capacity allocation plan (CAP). In order for the NMS 202 to adjust the current CAP or otherwise apply a new capacity allocation that effects the at least one transmission trail, the NMS 202 may initiate a coordinated set of commands to each of the SUNEs 110-1 and 110-2. As should be appreciated, the NMS 202 may send the set of commands to N number of SUNEs, such as SUNEs 110-1 . . . 110-N, depending on the number of SUNEs associated with a given transmission trail.

In an embodiment, the optical communication system 100 may include multiple CAPS s stored in a database, such as the CAPs database 506. The CAPs database 506 may reside on, for example, the NMS 202 located in the CLS1, or any other computer system within a cable landing station. The active WPM service 106-1 may switch a presently active CAP based on, for example, a predefined schedule, real-time OTN usage, or manual user input. The predefined schedule may include a daily, weekly, or monthly schedule that causes one or more SUNEs, such as SUNEs 110-1 and 110-2, to switch from a first CAP to a second CAP. For example, at 5:00 PM of each weekday a predefined schedule may cause one or more SUNEs to switch from a first CAP to a second CAP based on commands from the active WPM service 106-1, with the second CAP accounting for an expected increased load in user-initiated traffic (e.g., voice over IP (VoIP), data communications and so on). In any event, the predefined schedule may be fine-grained (e.g., hourly, daily) or course-grained (weekly, monthly), with each schedule causing N number of CAPs to be applied to N number of associated SUNEs.

For manual CAP changes, the NMS 202 may provide a CAP interface 502. The CAP interface 502 may include one or more GUIs configured to allow a user, such as user 204, to cause the NMS 202 to modify and create CAPs, and to create predefined schedules, if desired. In addition, the CAP interface 502 may include one or more GUIs configured to cause one or more SUNEs to switch to a particular CAP.

As shown, when CAP changes occur automatically or through manual user-intervention, the active WPM service 106-1 uses a particular CRE to communicate with SUNEs associated with the CAP change. As discussed below, the active WPM service 106-1 determines the particular CRE to apply CAP changes based on the nominally shortest or otherwise least error prone CR telemetry path relative an associated CRE and the particular SUNE to be communicated with. For example, and as shown, the active WPM service 106-1 uses CRE 114-1 to communicate with the SUNE 110-1 via the CR telemetry path 112-X. In this example, CR telemetry path 112-X may be the nominally shortest or otherwise least error prone path to the SUNE 110-1. Likewise, the CR telemetry path 112-Y may be the nominally shortest or otherwise least error prone optical path to the SUNE 110-2.

As previously discussed, changes to SUNEs such as switching CAPs causes updates to the NML layer to occur. In some case, the optical communication system 100 uses the NML dynamic trail service 508 to receive notification of SUNE changes and provides the same to an NMS trail interface 504. In turn, the NMS trail interface 504 may include one or more GUIs configured to visually depict a real-time or otherwise up-to-date representation of network topology of the optical communication system 100.

Example Methodologies and Architecture

Figure 6A:
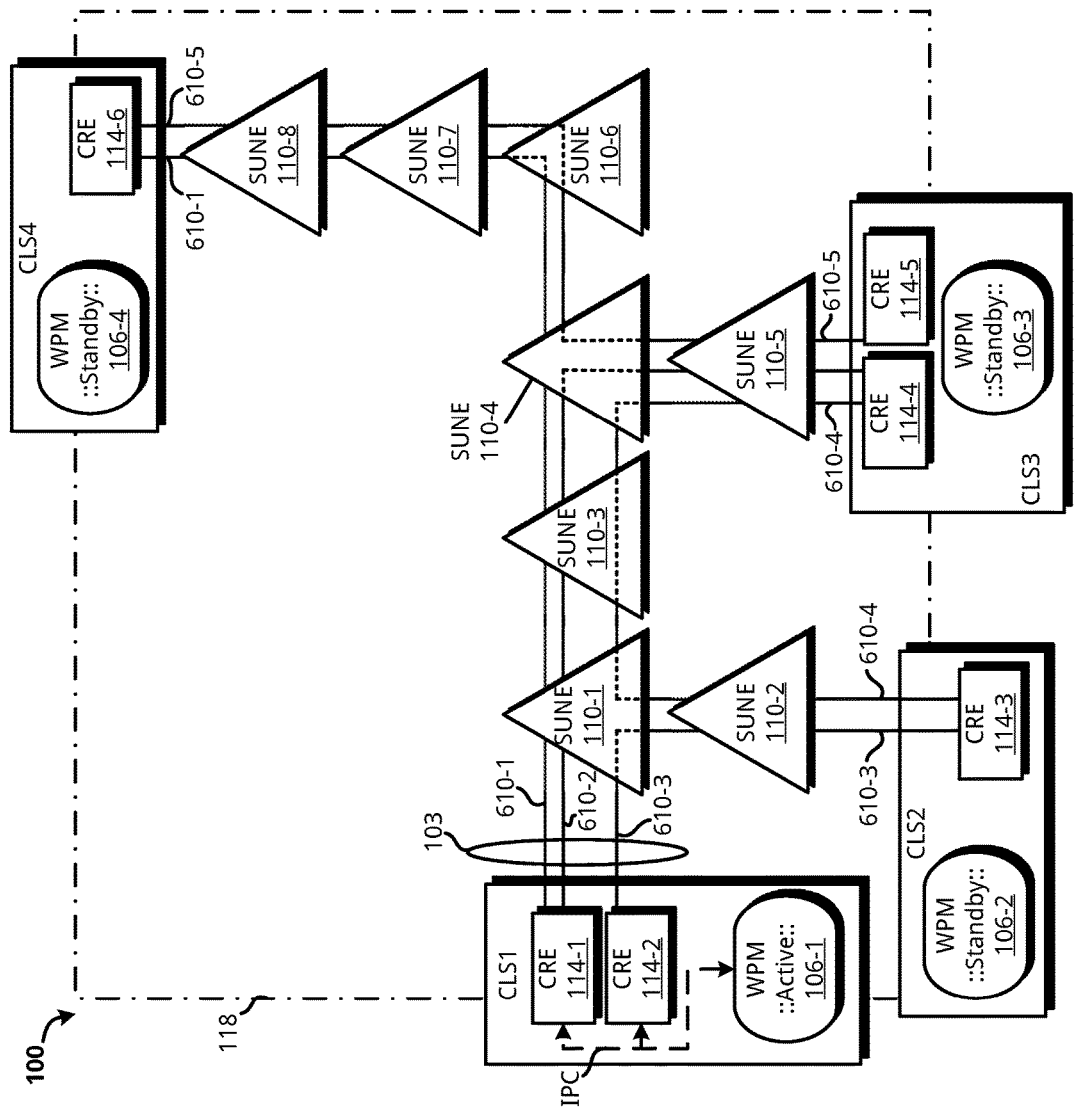
FIG. 6A shows a block diagram illustrating another embodiment of the optical communication system of FIG. 1.

Now referring to FIG. 6A, one example block diagram shows an embodiment of the optical communication system 100, and includes a plurality of cable landing stations CLS1 . . . CLS4 communicatively coupled to a plurality of SUNEs 110-1 . . . 110-8, in accordance with an embodiment of the present disclosure. In some cases, CLS1 and CLS4 are geographically separated by at least 10 kilometers, or more. Likewise, CLS2 and CLS3 may be separated from each other, and from CLS1 and CLS4, by large distances (e.g., 1 to 10+ kilometers).

As previously discussed, these distances separating opposite cable landing stations may include large spans of ocean. To this end, the optical cable 103 and associated optical components (e.g., the SUNEs 110-1 . . . 110-8) may be located at the ocean floor or otherwise out-to-sea, and staggered at varying distances between cable landing stations. For example, the SUNE 110-1 may be physically disposed at least 1 kilometer from CLS1 and by at least 1 kilometer from adjacent SUNEs 110-2 and 110-3. Likewise, each of the SUNEs 110-2 . . . 110-8 may be physically disposed at a particular distance from one another to ensure an optical signal is amplified, attenuated, repeated, or otherwise conditioned in a manner that allows an optical signal to propagate via the optical fiber pairs of the cable 103 without significant or otherwise unacceptable loss, attenuation and dispersion. The exact distance between SUNEs, and more particularly, optical cable lengths may be based on application-specific requirements such as ocean floor topology. As discussed below, the optical communication system 100 may use these known distances between SUNEs and CREs to determine which CRE may provide the nominally shortest or otherwise least error prone path to a given SUNE.

As shown, each cable landing stations CLS1 . . . CLS4 includes one or more CREs of the CREs 114-1 . . . 114-6 and a respective instance of the WPM services 106-1 . . . 106-4. Each of the CREs 114-1 . . . 114-6 is communicatively coupled to one or more pairs of optical fiber pairs 610-1 . . . 610-5. For example, cable landing stations CLS1 includes CRE 114-1 coupled to optical fiber pairs 610-1 and 610-2. On the other hand, CRE 114-2 within the CLS1 is coupled to a single optical fiber pair 610-3. So each of the CREs 114-1 . . . 114-6 may communicatively couple to one or more of the optical fiber pairs 610-1 . . . 610-5 to communicate with one or more of the SUNEs 110-1 . . . 110-8.

The SUNEs 110-1 . . . 110-8 may include OADM capabilities allowing for dynamic adjustments to channel allocation assignments via their respective optical fiber pairs. In addition, the SUNEs 110-1 . . . 110-8 may include pass-through capabilities, repeater functionality, signal attenuation, signal amplification and dispersion management, for example. As shown, SUNE 110-1 couples to optical fiber pairs 610-1 and 610-2 and allows each to pass through to adjacent SUNE 110-3. SUNE 110-1 also couples to optical fiber pair 610-3 which may include OADM capabilities to selectively provide certain channel wavelengths to SUNE 110-2.

The optical communication system 100 of FIG. 6 further includes a DCN 118. DCN 118 may include off-cable network paths (e.g., a WAN) which provides data communications between each of the cable landing stations CLS1 . . . CLS4. As will be discussed below, this advantageously allows communication between cable landing stations in the event of a cable cut or other disruption along the optical cable 103. The DCN 118 may also occur over one or more optical fiber pairs of the optical cable 103, which may generally referred to as an on-cable network path.

In an embodiment, the relationship between the SUNEs 110-1 . . . 110-8 and the CREs 114-1 . . . 114-6 is many to many (N:N) such that any CRE with fiber pair connectivity to a SUNE can communicate with that SUNE. For example, and as shown in FIG. 6A, CRE 114-2 may command SUNE 110-2 via optical fiber pair 610-3. In addition, CRE 114-3 may also command SUNE 110-2 via optical fiber pair 610-3 or optical fiber path 610-4. To this end, depending on the particular fiber-pair topology of the optical system (e.g., how many optical fiber pairs may provide communication channels from a given CRE to a given SUNE), the active WPM service 106-1 may use local or remote CREs to communicate with a particular SUNE. The active WPM service 106-1 may determine which CRE to use based on a method that accounts for CRE location relative to SUNE location. One such example method is discussed below with reference to FIG. 6B.

Figure 6B:
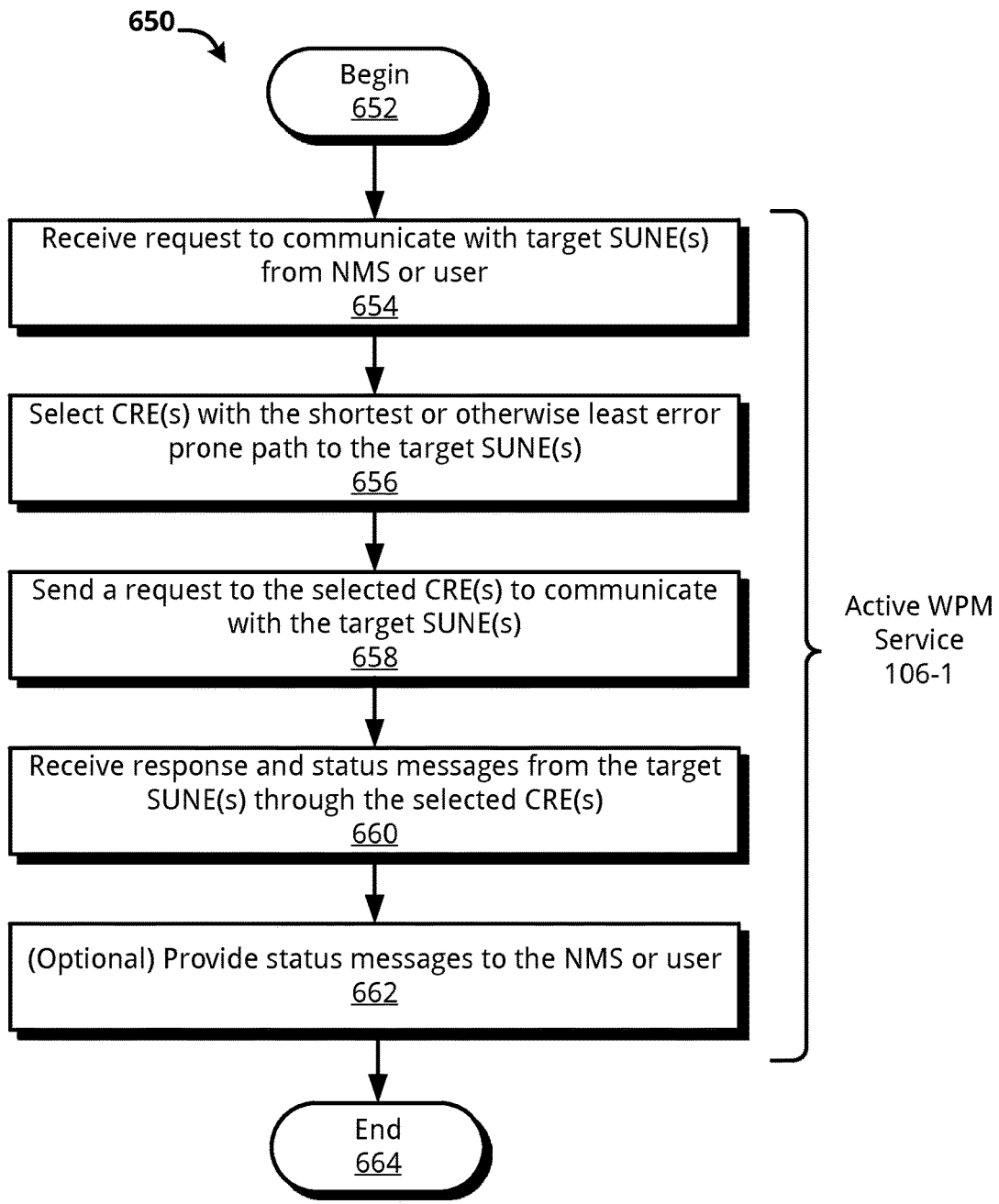
FIG. 6B shows an example method for determining a particular Command/Response Equipment (CRE) to use when commanding or otherwise communicating with a target SUNE of the optical communication system of FIG. 6A, in accordance with an embodiment of the present disclosure.

FIG. 6B shows one example method 650 for an active WPM service, such as the active WPM service 106-1, to determine a particular CRE to use when commanding or otherwise communicating with a target SUNE of the optical communication system 100, in accordance with an embodiment of the present disclosure. The method 650 includes acts of receiving a request to communicate or otherwise command target SUNE(s), selecting CRE(s) with the nominally shortest or otherwise least error prone optical path to the target SUNE(s), sending a request to the selected CRE(s) to communicate with the target SUNE(s), receiving response and status messages from the target SUNE(s) through the selected CRE(s), and optionally providing status messages to the NMS or user that initiated the request to communicate with the target SUNE(s). Method 650 begins in act 652.

In act 654, the active WPM service 106-1 receives a request to communicate with target SUNE(s) from the NMS 202 or the user 204. In some case, the request targets a single SUNE, while in other cases the request targets multiple SUNEs. The request may be manifested as a sequence of asynchronous requests via the DCN 118. The request may include a user-initiated request, or an automated NMS-initiated request. In any event, the request may include, for example, a request for a SUNE's present configuration, a command to turn off one or more notification types (e.g., fault notifications, configuration changes, and so on), a command to change configuration caused by fault-recovery or caused by CAP changes, and a request to receive SUNE performance measurements such as optical receiver and/or transmitter optical power. As discussed below, the ability to turn off certain notifications may allow the active WPM service 106-1 to temporarily silence a number of SUNEs in order to determine the source of a particular fault message or event.

In act 656, the active WPM service 106-1 selects one or more CREs with the nominally shortest or otherwise least error prone optical path to each of the targeted SUNE(s).

Recall that each path provided by optical fiber pairs 610-1 . . . 610-5 may provide a CR telemetry path (e.g., CR telemetry path 112-1 and 112-2 of FIG. 2) for commanding a particular SUNE. For example, and as shown in FIG. 6A, the optical communication system 100 may include multiple CREs, and multiple paths from the CREs to a given SUNE. For example, the SUNE 110-2 includes a plurality of CR telemetry paths including the path extending from CRE 114-2 by way of optical fiber pair 610-3, and the paths extending from CRE 114-3 by way of optical fiber pairs 610-3 and 610-4. At the same time, CRE 114-2 may command SUNE 110-3 by way of optical fiber pair 610-3. CRE 114-4 may also command SUNE 110-3 by way of optical fiber 610-4.

However, each CR telemetry path may vary in distance/cable length such that some CREs are relatively closer to a particular SUNE than others. For example, the SUNE 110-2 is adjacent to the CRE 114-2 of CLS1 and the CRE 114-3 of CLS2. So the nominally shortest path may include optical fiber pair 610-3 or 610-4, relative to the paths provided by optical fiber pair 610-3, for example. However, note that the nominally shortest path may not necessarily correspond with geographic distances between two points. For example, CLS1 may be located geographically closer to the SUNE 110-2 than the CLS2 in the prior example. However, the build out of the optical cable 103 may include a length L of optical cabling disposed between the CRE 114-2 and the SUNE 110-2 to account for, for example, ocean floor topology. To this end, the length L of optical cabling disposed between the CRE 114-2 and the SUNE 110-2 may be longer than a corresponding length of cable between the CRE 114-3 and the SUNE 110-2. In addition, the nominally shortest path may also be based on a path with the least number of "hops" or optical components that repeat, amplify and/or attenuate optical signals. Thus, nominally shortest path may be selected based on a plurality of factors including, for example, optical cable lengths, number of hops, and geographic proximity. In an embodiment, a path may also be chosen based on known reliability factors such as, for example, links status (e.g., link up/down), bit error rates, and fault conditions. In one particular example, a CREs may actively report performance degradation and fault conditions. Such information may be utilized when selecting a particular path.

Figure 7:
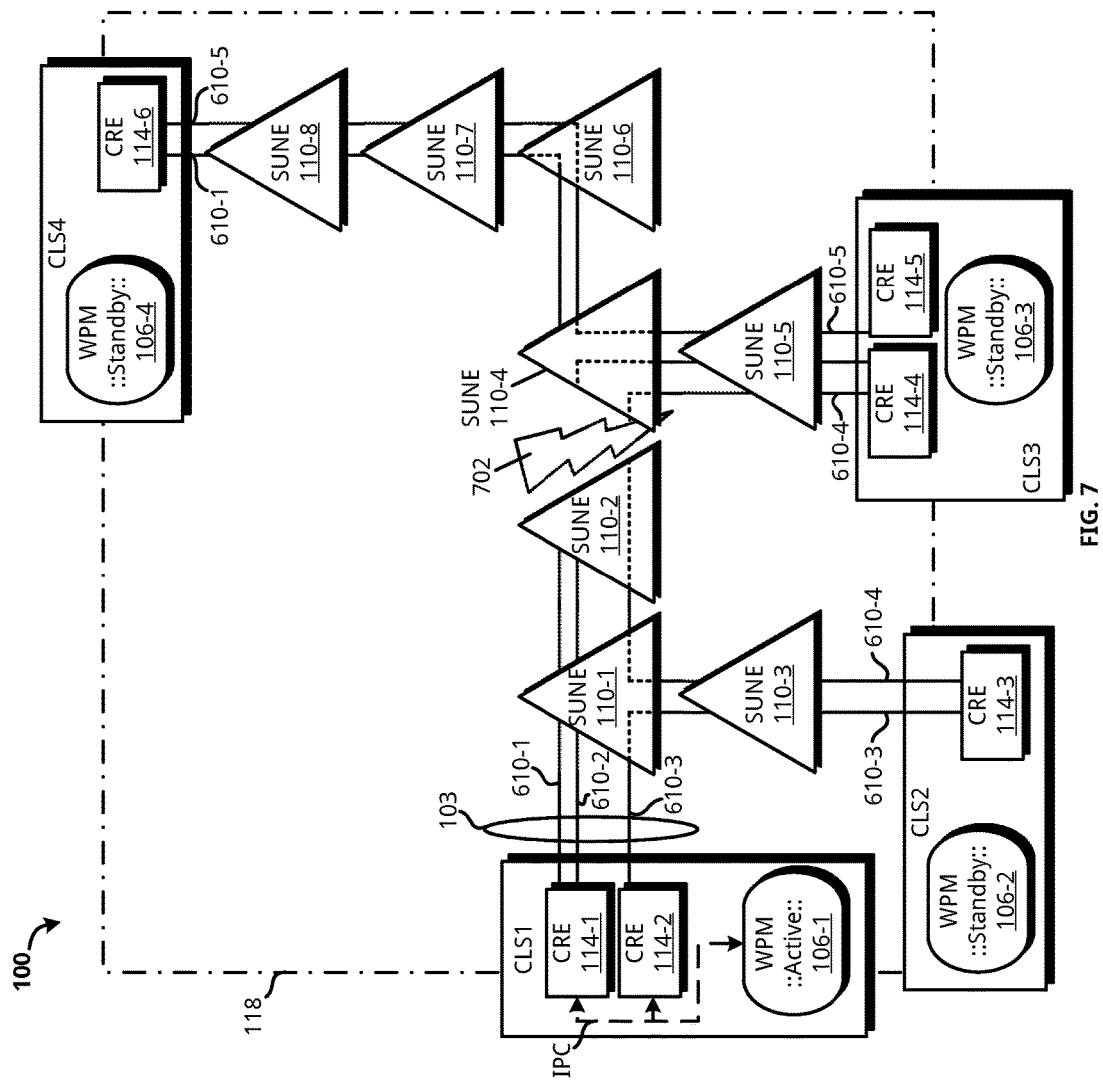
FIG. 7 shows the optical communication system of FIG. 6A with a cable break or other network interruption along an optical cable system coupled to a plurality of SUNEs, in accordance with an embodiment of the present disclosure.

In an embodiment, cable cuts and other interruptions such as power feed equipment (PFE) failures may affect network topology of the optical communication system 100. As previously discussed with regard to FIG. 2, SUNEs may provide event notifications resulting from these interruptions to the active WPM service 106-1. For example, and referring to the example embodiment of the optical communication system 100 shown in FIG. 7, a cable cut 702 or other network interruption between SUNE 110-2 and 110-4 is shown. In this specific example, multiple SUNEs that couple to the optical fiber pairs 610-1, 610-2, 610-4, 610-5 may each report a network fault event to associated CREs, which in turn report the network fault event to the active WPM service 106-1. The WPM service 106-1 may update the known network topology for the optical communication system 100 based on this network fault event. Accordingly, the active WPM service 106-1 may use the updated network topology to select a CRE that may not be impacted by the network interruption. For example, if the request received in act 654 identified SUNE 110-5, the active WPM service 106-1 may select CRE 114-4 or 114-5 located in CLS3 to satisfy the request via the off-cable DCN 118. This is because cable cut 702 interrupts the on-cable DCN over the optical cable 103 between the active WPM service 106-1 and the SUNEs 110-4 . . . 110-8. Thus the active WPM service 106-1 may advantageously utilize the off-cable DCN 118 when on-cable data connectively is disrupted, such as shown in FIG. 7.

FIG. 8 illustrates another example of a cable cut 702 or other network interruption occurring at multiple positions along the optical cable 103, in accordance with an embodiment of the present disclosure. As shown, the cable cut 702 occurring at multiple locations splits the optical communication system 100 into three distinct segments. Thus the active WPM service 106-1 may use CREs still able to communicate with target SUNE(s) via the off-cable DCN 118. For example, the active WPM service 106-1 may utilize CRE 114-4 to command SUNEs 110-4 and 110-5.

Returning to FIG. 6B, and act 656, the active WPM service 106-1 use additional considerations when selecting one or more CREs to satisfy the request received in 654. For example, the active WPM service 106-1 may communicate with a particular CRE via the DCN 118, for example, to determine how many queued operations are presently pending within the particular CRE's stack, to determine if a CRE is online (e.g., able to process a request), and to determine whether the CRE is presently able to communicate with a target SUNE. Also note that the active WPM service 106-1 may retrieve the same information from the dynamic routing database 302 without communicating directly with each CRE. And further, the active WPM service 106-1 may also consider the present traffic/bandwidth usage over each particular path. For instance, the active WPM service 106-1 may favor a CRE coupled to an optical fiber pair with a relatively low amount of bandwidth presently in use by communications of the optical communication system 100.

In any event, once the active WPM service 106-1 selects one or more CREs to communicate with the target SUNE(s) identified in the request received in act 654, the method 650 continues to act 658. In act 658, the active WPM service 106-1 sends the request received in act 654 to the one or more CREs selected in act 656. In some cases, the request may include sending a sequence of commands to the one or more CREs selected in act 656. In these cases, the active WPM service 106-1 may throttle transmission rates and other transmission-related parameters to ensure a minimal amount of data traffic gets introduced onto the DCN 118. In turn, the one or more selected CREs may utilize CR telemetry paths provided by respective ones of fiber pairs 610-1 . . . 610-5 to command target SUNE(s) in accordance with the request.

In a general sense, SUNEs may service commands of two types: commands requiring a response, and commands that do not require a response. For those commands that do not necessarily require a response from the target SUNE(s), the active WPM service 106-1 may return a completion message, or an acknowledgement "ACK" message to the client. One such example message includes a command to turn off notifications. Conversely, those commands necessitating a response, the active WPM service 106-1 may listen for a predefined period of time to the one or more CREs selected in act 656 and used to command the target SUNE(s). The WPM service 106-1 may also listen for responses from multiple CREs that received the same response. Some example commands that may cause duplicated responses include measurement requests, CAP switching, firmware upgrades, and reconfigurations/re-provisioning, just to name a few. In any event, and in act 662, the active WPM service 106-1 optionally sends status messages to the NMS 202 or the user 204 depending on the type of request made. The method 650 ends in act 664.

In an embodiment, SUNEs may raise a notification or alarm based on self-diagnosis or a particular measurement exceeding a particular threshold value. Some non-limiting examples include receive and/or transmit optical power, detection of light within critical circuit points, and bit error rates. The cable cuts 702 shown in FIGS. 7 and 8 may cause one or more SUNEs to propagate such a notification to associated CREs. However, and as discussed above, two or more SUNEs may communicate via the same optical fiber pair(s), such as optical fiber pairs 610-4 and 610-3 shared by SUNE 110-4 and 110-5 for example. This may result in the active WPM service 106-1 receiving multiple notifications from two or more SUNEs related to the same event, or a different event as the case may be.

Figure 9A:
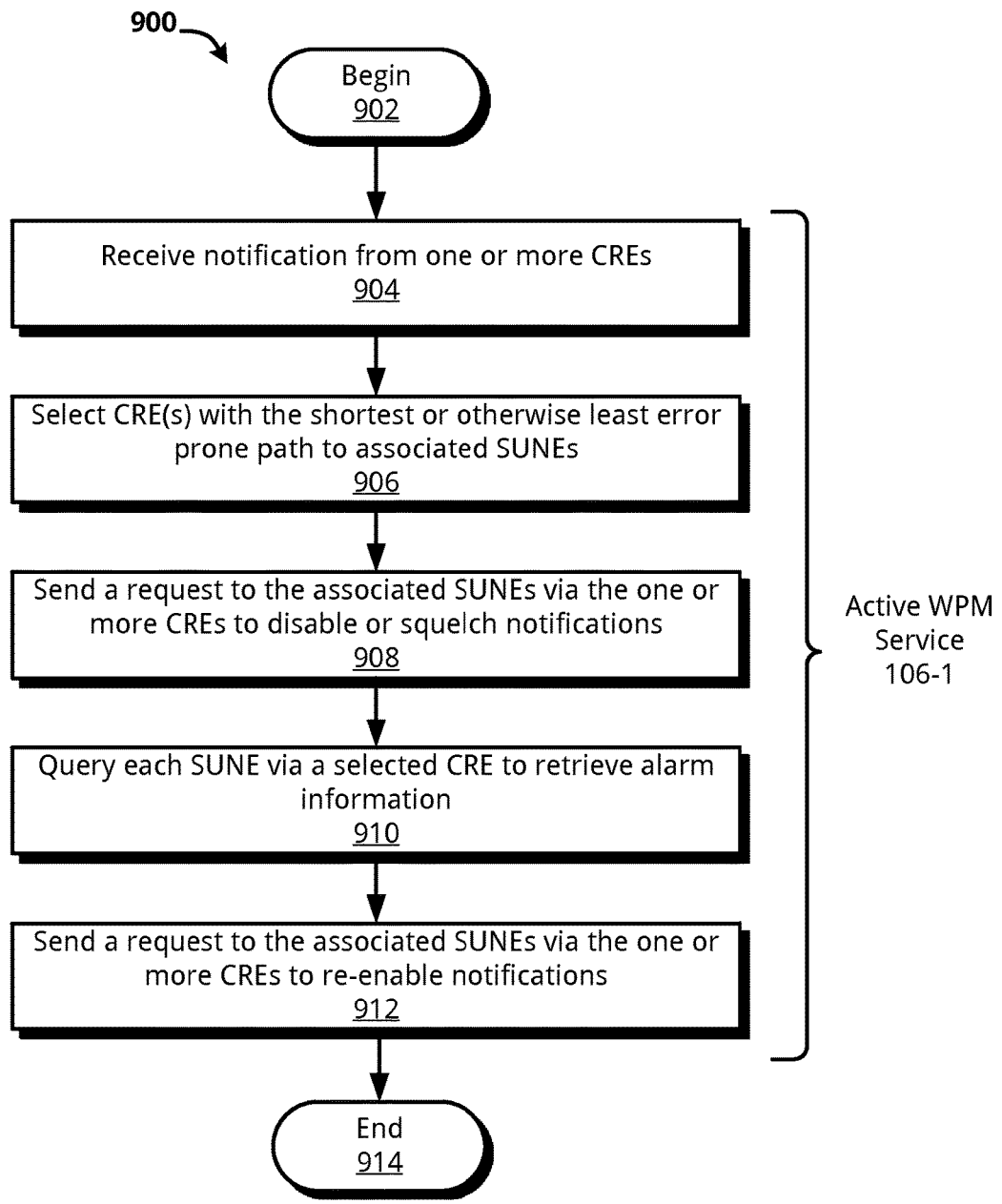
FIG. 9A shows an example method for identifying which SUNE originated a notification, and retrieving alarm information for the same to determine a cause for the notification, in accordance with an embodiment of the present disclosure.
Figure 10:
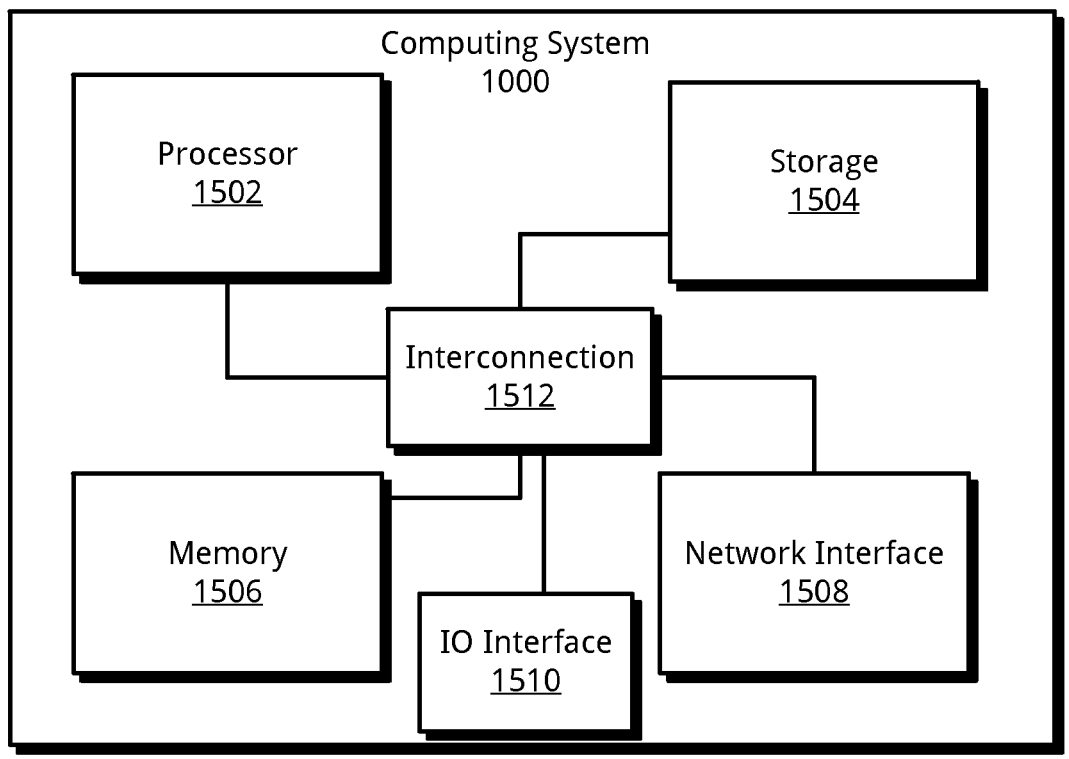
FIG. 10 shows an example computer system configured to execute various embodiments of the present disclosure.

FIG. 9A shows an example method 900 for determining which SUNE raised a notification in the event two or more SUNEs share the same optical fiber pairs, in accordance with an embodiment of the present disclosure. Method 900 beings in act 902.

In act 904, the active WPM service 106-1 receives a notification from one or more CREs. In some cases, the notification corresponds to a cable cut or other network interruption reported by two or more associated SUNEs. Each SUNE may report such interruptions via an interrupt signal sent to one or more associated CRE(s). For example, each of the SUNEs 110-1 . . . 110-8 in FIGS. 7 and 8 may send interrupt signals in any direction along optical cable 103 to associated CREs. One such example interrupt signal is shown in the example protocol flow of FIG. 9C.

In act 906, the active WPM service 106-1 selects one or more CREs with the nominally shortest or otherwise least error prone optical path to the two or more associated SUNEs that caused the notification to propagate. In an embodiment, the active WPM service 106-1 determines which CREs have the nominally shortest or otherwise least error prone optical path to the associated SUNEs in a manner substantially similar to act 656 of FIG. 6B, which will not be repeated for the sake of brevity.

In act 908, the active WPM service 106-1 sends a request to stop subsequent notifications to each of the associated SUNEs via the CREs selected in act 906. In some cases, this includes the active WPM service 106-1 sending a broadcast to the CREs selected in act 906. In turn, the request to stop subsequent notifications causes each of the associated SUNEs to suspend notifications until another request re-enables notifications.

In act 910, the active WPM service 106-1 sends a query to each associated SUNE via the CREs selected in act 906. In some cases, the active WPM service 106-1 orders/sequences the requests based on a prioritization scheme that deduces a SUNE most likely to have raised the notification. This may include the active WPM service 106-1 traversing a mapping of SUNE to CRE relationships stored in the dynamic routing database 302. For example, the active WPM service 106-1 may correlate the geographic location of the particular CRE's receiving the notifications and identify one or more SUNE's as high-priority candidates based on those SUNEs having transmission trails connected to the particular CRE. In another example, consider if the active WPM service 106-1 receives alarm notifications from CRE 114-2, CRE 114-3, and CRE 114-4. In this example, the active WPM service 106-1 may scan the mapping and identify SUNE 110-2 as the highest priority candidate SUNE. Yet another example includes if the active WPM service 106-1 receives alarm notifications from CRE 114-1, CRE 114-2 and CRE 114-3. In this example, the active WPM service 106-1 may scan the mapping and determine that SUNE 110-2 is the highest priority candidate SUNE. In any event, the active WPM service 106-1 may deduce the highest priority candidate and query the same to retrieve alarm information that may indicate the criticality of the alarm, and what internal parameters may have caused the alarm. The WPM service 106-1 may not necessarily query all remaining SUNEs once a SUNE originating an alarm notification is identified. Thus the prioritization scheme may minimize or otherwise reduce the total number of queries initiated by the active WPM service 106-1. In the event the first SUNE queried by the active WPM service 106-1 did not originate the alarm, the active WPM service 106-1 continues to query each SUNE until the source is identified.

In act 912, the active WPM service 106-1 sends a request to the associated SUNEs via the one or more CREs selected in act 906 to re-enable notifications. The method 900 ends in act 914.

In an embodiment the active WPM service 106-1 may receive a plurality of alarm/notifications over a predefined period of time (e.g., 100 milliseconds to 10 seconds) and perform deduplication of the same such that a non-redundant list of aggregated alarms/notifications gets established. The WPM service 106-1 may send the de-duplicated list of alarms/notifications to the NMS 202 or the user 204, or both. In addition, and in accordance with an embodiment, the active WPM service 106-1 may initiate response actions in the event of an alarm notification. One such example recovery action is discussed below with reference to FIG. 9C.

Figure 9B:
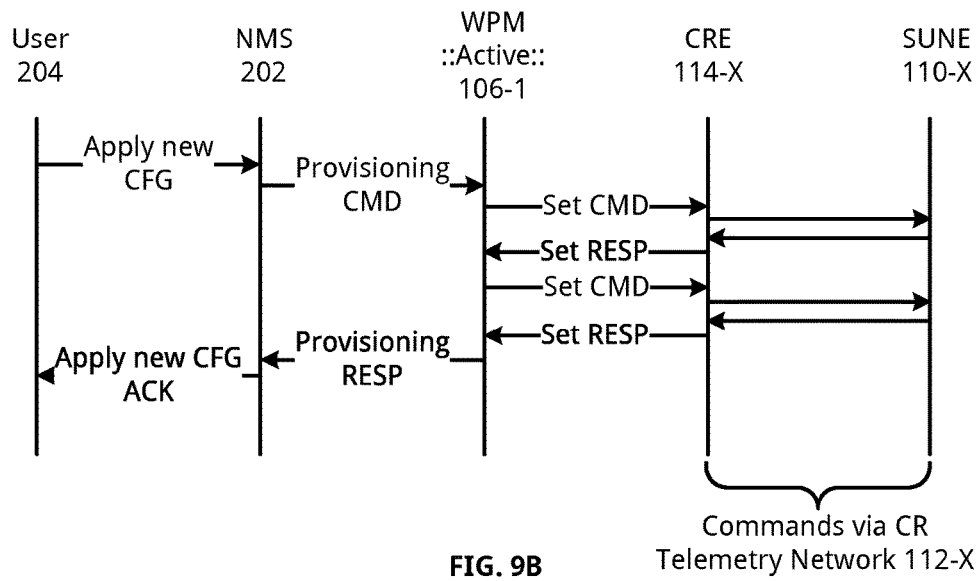
FIG. 9B shows an example protocol flow and illustrates a user causing a SUNE to be reconfigured during a provisioning scheme in accordance with an embodiment of the present disclosure.

Now referring to FIG. 9B, an example protocol flow is shown and illustrates the user 204 causing the SUNE 110-X to be reconfigured during a provisioning scheme in accordance with an embodiment of the present disclosure. As shown, the user 204 sends a request to the NMS 202 to apply a new configuration to a particular SUNE. In response, the NMS 202 sends a provisioning command to the active WPM service 106-1. In some cases, the provisioning command identifies a particular CAP to apply. In other cases, the provisioning command includes one or more configuration parameters that the user 204 desires to change within the SUNE 110-X. In any event, the active WPM service 106-1 sends a "set" command to the CRE 114-X. In some cases, the CRE 114-X was selected in accordance with act 656 of FIG. 6B such that the nominally shortest or otherwise least error prone path (e.g., CR telemetry path 112-X) is used. In turn, the CRE 114-X sends one or more commands to the SUNE 110-X by converting the one or more commands into low-level signals capable of transmission via a CR telemetry path, such as the CR telemetry path 112-X. The SUNE 110-X may respond (as shown), or may simply apply a change without responding. In cases where the SUNE 110-X responds, a response is propagated back to the user 204 via the active WPM service 106-1 and the NMS 202. As previously discussed, the user 204 may utilize one or more GUIs to perform provisioning changes and receive status regarding those changes. To this end, the response from the SUNE 110-X may get presented to the user 204 via a GUI, for example.

Figure 9C:
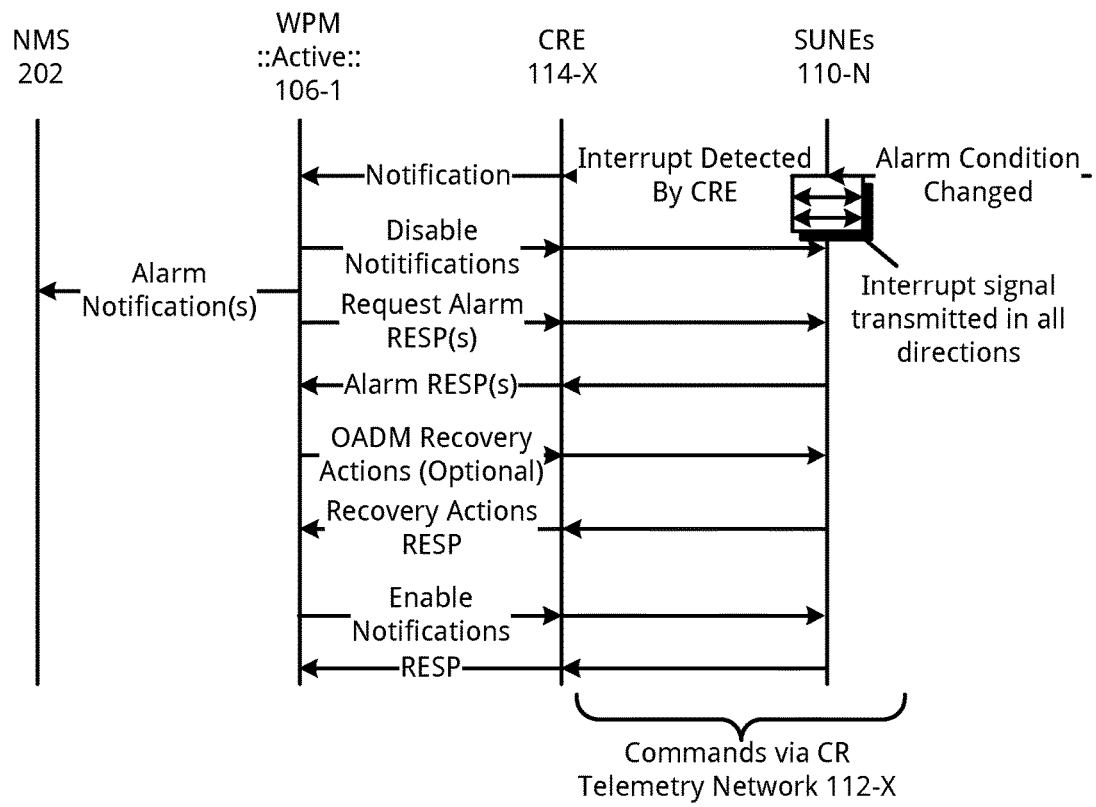
FIG. 9C shows another example protocol flow and illustrates an active WPM service providing aggregated alarm notifications to an NMS and determining a cause of the alarm notifications by querying one or more SUNEs, in accordance with an embodiment of the present disclosure.

Now referring to FIG. 9C, another example protocol flow is shown and illustrates the active WPM service 106-1 providing aggregated alarm notifications to the NMS and determining a cause of the alarm notifications by querying one or more SUNEs, in accordance with an embodiment of the present disclosure. The example protocol flow of FIG. 9C is substantially similar to that of the method 900 of FIG. 9A, but with the inclusion of a recovery action performed in response to an alarm notification by a SUNE.

As shown, the active WPM service 106-1 receives a notification from the CRE 114-X that an interrupt was detected from the SUNE 110-N in the form of an interrupt signal. The SUNE 110-N may be any number of SUNEs sharing optical fiber pairs with the CRE 114-X. In response, the active WPM service 106-1 may disable subsequent notifications by broadcasting or otherwise directing a command (e.g., Disable Notifications) to the CRE 114-X. In turn, the CRE 114-X sends the same to the SUNEs 110-N which may cause each SUNE to suspend subsequent notifications.

The active WPM service 106-1 may determine a list of candidate SUNEs that may have originated the notification, as discussed above. After a brief period of time (e.g., 100 ms to 5 s) after disabling notifications, the active WPM service 106-1 may send a command to request alarms (e.g., Request Alarm) to the CRE 114-X identifying the most-likely candidate SUNE. Note that the active WPM service 106-1 may use a different CRE (e.g., a CRE that did not propagate the notification) if that different CRE provides the nominally shortest or otherwise least error prone optical path to the most-likely candidate SUNE, for example. In any such cases, the most-likely candidate SUNE may respond with alarm information. In the event the most-likely candidate SUNE was not the originator of the notification, the active WPM service 106-1 queries a next most-likely candidate SUNE until the origin of the notification is located.

Once the origin of the notification is determined, the active WPM service 106-1 may use the received alarm information to determine a root cause for the same. For example, the active WPM service 106-1 may determine a cable cut or other network interrupt occurred (e.g., as shown in FIGS. 7 and 8) based on the alarm information. The active WPM service 106-1 may optionally initiate recovery actions. For example, the active WPM service 106-1 may initiate re-provisioning (e.g., applying a different CAP or channel assignment) such that one or more SUNEs modify or create transmission trails around the network interruption. As should be appreciated in light of this disclosure, other recovery actions are also within the scope of this disclosure. For example, recovery actions may include directing traffic to a redundant path or switching to redundant components. The active WPM service 106-1 may re-enable notifications after determining which SUNE(s) originated a notification and optionally performing recovery actions.

Example Computer System

FIG. 10 illustrates a computing system 1000 configured to execute WPM/NMS processes in accordance with techniques and aspects provided in the present disclosure. As can be seen, the computing system 1000 houses a processor 1002, a data storage device 1004, a memory 1006, a network interface 1008, an IO interface 1510 and an interconnection element 1512. To execute at least some aspects provided herein, the processor 1502 receives and performs a series of instructions that result in the execution of routines and manipulation of data. In some cases, the processor is at least two processors. In some cases, the processor may be multiple processors or a processor with a varying number of processing cores. The memory 1506 may be random access (RAM) and configured to store sequences of instructions and other data used during the operation of the computing system 1000. To this end, the memory 1506 may be a combination of volatile and non-volatile memory such as dynamic random access memory (DRAM), static memory (SRAM), or flash memory, etc. The network interface 508 may be any interface device capable of network-based communication. Some examples of such a network interface include an Ethernet, Bluetooth, Fibre Channel, Wi-Fi and RS-232 (Serial). The data storage device 1504 includes any computer readable and writable non-transitory storage medium. The storage medium may have a sequence of instructions stored thereon that define a computer program that may be executed by the processor 1502. In addition, the storage medium may generally store data in contiguous and non-contiguous data structures within a file system of the storage device 1504. The storage medium may be an optical disk, flash memory, a solid state drive (SSD), etc. During operation, the computing system 1500 may cause data in the storage device 1504 to be moved to a memory device, such as the memory 1506, allowing for faster access. The IO interface 1510 may be any number of components capable of data input and and/or output. Such components may include, for example, a display device, a touchscreen device, a mouse, a keyboard, a microphone, external device (USB, fire wire, etc.) and speakers. The interconnection element 1512 may comprise any communication channel/bus between components of the computing system 1500 and operate in conformance with standard bus technologies such as USB, IDE, SCSI, PCI, etc.

Although the computing system 1000 is shown in one particular configuration, aspects and embodiments may be executed by computing systems with other configurations. As discussed above, some embodiments include a controller 1106 comprising a tablet device. Thus, numerous other computer configurations and operating systems are within the scope of this disclosure. For example, the computing system 1000 may be a propriety computing device with a mobile operating system (e.g., an Android device). In other examples, the computing system 1000 may implement a Linux/Unix, Windows®, or Mac OS® operating system. Many other operating systems may be used, and examples are not limited to any particular operating system.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Elements, components, modules, and/or parts thereof that are described and/or otherwise portrayed through the figures to communicate with, be associated with, and/or be based on, something else, may be understood to so communicate, be associated with, and/or be based on in a direct and/or indirect manner, unless otherwise stipulated herein.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements. As used herein, use of the term "nominal" or "nominally" when referring to an amount means a designated or theoretical amount that may vary from the actual amount.

In one aspect of the present disclosure an optical communication system is disclosed. The optical communication system comprises a cable system including at least one optical cable configured to provide a first portion of a data communications network and a plurality of Command/Response telemetry paths, a first and second cable landing station coupled to the cable system, a first wet plant access point disposed in the first cable landing station, and a second wet plant access point disposed in the second cable landing station, wherein each of the first and second wet plant access points are coupled to the at least one optical cable by an associated optical fiber, at least one Smart Undersea Network Element coupled to the at least one optical cable by an associated optical fiber and configured to send and receive optical signals from the first wet plant access point of the first cable landing station via a first Command/Response telemetry path, and to send and receive optical signals with the second wet plant access point of the second cable landing station via a second Command/Response telemetry path, and a first wet plant manager in the first cable landing station configured to receive a request via the data communication network to send a command to the at least one Smart Undersea Network Element, and in response thereto, selecting a wet plant access point of the first or second wet plant access points to service the request based at least in part on an associated Command/Response telemetry path that provides a nominally shortest or least error prone optical path to the at least one Smart Undersea Network Element.

In another aspect of the present disclosure, a computer-implemented method for communication with a Smart Undersea Network Element is disclosed. The computer-implemented method comprises receiving, by a wet plant manager located in a first cable landing station, a first request to communicate with a target Smart Undersea Network Element, the first request including a command to perform via the SUNE, selecting, by the wet plant manager located in the first cable landing station, a wet plant access point to service the request based on the wet plant access point being coupled to a Command/Response telemetry path that provides a nominally shortest or least error prone optical path to the target Smart Undersea Network Element, and sending, by the wet plant manager located in the first cable landing station, the command to the target Smart Undersea Network Element via the selected wet plant access point using the Command/Response telemetry path that provides the nominally shortest or least error prone optical path.

In yet another aspect of the present disclosure a non-transitory computer-readable medium having a plurality of instructions encoded thereon is disclosed that when executed by at least one processor cause a wet plant manager process to be carried out. The process being configured to receive a first request to communicate with a target Smart Undersea Network Element, the first request including a command to perform via the target Smart Undersea Network Element, select a wet plant access point to service the request based on the wet plant access point being coupled to a Command/Response telemetry path that provides a nominally shortest or least error prone optical path to the target Smart Undersea Network Element, and send a request to the selected wet plant access point, the request identifying the target Smart Undersea Network Element and the command.

While the principles of the disclosure have been described herein, it is to be understood by those skilled in the art that this description is made only by way of example and not as a limitation as to the scope of the disclosure. Other embodiments are contemplated within the scope of the present disclosure in addition to the embodiments shown and described herein. Modifications and substitutions by one of ordinary skill in the art are considered to be within the scope of the present disclosure, which is not to be limited except by the following claims.

What is claimed is:

1. An optical communication system comprising:
   a cable system including at least one optical cable configured to provide a first portion of a data communications network and a plurality of Command/Response telemetry paths;
   a first and second cable landing station coupled to the cable system;
   a first wet plant access point disposed in the first cable landing station, and a second wet plant access point disposed in the second cable landing station, wherein each of the first and second wet plant access points are coupled to the at least one optical cable by an associated optical fiber;
   at least one Smart Undersea Network Element coupled to the at least one optical cable by an associated optical fiber and configured to send and receive optical signals from the first wet plant access point of the first cable landing station via a first Command/Response telemetry path, and to send and receive optical signals with the second wet plant access point of the second cable landing station via a second Command/Response telemetry path; and
   a first wet plant manager in the first cable landing station configured to receive a request from a remote computing device via the data communication network to send a command to the at least one Smart Undersea Network Element, and in response thereto, selecting a wet plant access point of the first or second wet plant access points to service the request based at least in part on an associated Command/Response telemetry path that provides a nominally shortest or reliable optical path to the at least one Smart Undersea Network Element.

2. The optical communication system of claim 1, wherein each of the at least one Smart Undersea Network Element comprises an optical add/drop branching unit, a power feed branching unit, or a repeater.

3. The optical communication system of claim 1, wherein the second cable landing station includes a second wet plant manager, and wherein the second wet plant manager is configured to remain in standby in response to receiving a heartbeat message from the first wet plant manager.

4. The optical communication system of claim 1, wherein selecting the wet plant access point of the first or second wet plant access points includes at least one of determining a wet plant access point with the smallest number of hops to the at least one Smart Undersea Network Element, a wet plant access point associated with a Command/Response telemetry path having a bit error rate below a predefined threshold, a Command/Response telemetry path with the lowest packet retransmission count, and a Command/Response telemetry path having a bit error rate below an average bit error rate for a plurality of Command/Response telemetry paths.

5. The optical communication system of claim 1, wherein the first portion of the data communication network is provided on-cable such that data is sent and received as optical signals via the at least one optical cable of the cable system, and wherein a second portion of the data communication network is provided off-cable such that data is not sent and received via the at least one optical cable.

6. The optical communication system of claim 5, wherein the wet plant manager service of the first cable landing station communicates with the selected wet plant access point via a second portion of the data communication network when bandwidth usage of the on-cable portion of the data communication network exceeds a predefined limit or when a network interruption prevents communication between the wet plant manager service of the first cable landing station and the selected wet plant access point.

7. The optical communication system of claim 1, wherein the wet plant manager service of the first cable landing station is configured to receive a wet plant manager event from the at least one Smart Undersea Network Element via the first Command/Response telemetry path.

8. The optical communication system of claim 7, wherein the received wet plant manager event comprises at least one of a Smart Undersea Network Element configuration change notification, an optical add/drop multiplexer assignment change, and an alarm notification.

9. The optical communication system of claim 7, wherein the wet plant manager of the first cable landing station updates a dynamic routing database based in part on the received wet plant manager event, and wherein selecting a wet plant access point to service requests to communicate with the at least one Smart Undersea Network Element is based at least in part on associations between wet plant access point identifiers and the at least one Smart Undersea Network Element stored within the dynamic routing database.

10. The optical communication system of claim 1, further comprising:
    a network management system configured to receive wet plant manager events from the wet plant manager of the first cable landing station and update a network topology map based on the received wet plant manager event.

11. The optical communication system of claim 10, wherein the network management system provides a graphical user interface configured to provide a visual representation of the network topology map.

12. The optical communication system of claim 1, wherein the wet plant manager service of the first cable landing stations includes a plurality of capacity allocation plans that define a plurality of transmission trails associated with the at least one Smart Undersea Network Element.

13. The optical communication system of claim 12, wherein the wet plant manager service of the first cable landing station applies a particular capacity allocation plan of the plurality of capacity allocation plans to the at least one Smart Undersea Network Element in response to a predefined schedule or manual user input.

14. A computer-implemented method for communication with a Smart Undersea Network Element, comprising:
    receiving, by a wet plant manager located in a first cable landing station, a first request to communicate with a target Smart Undersea Network Element (SUNE) from a remote computing device, the first request including a command to perform via the SUNE;
    selecting, by the wet plant manager located in the first cable landing station, a wet plant access point to service the request based on the wet plant access point being coupled to a Command/Response telemetry path that provides a nominally shortest or reliable optical path to the target Smart Undersea Network Element; and
    sending, by the wet plant manager located in the first cable landing station, the command to the target Smart Undersea Network Element via the selected wet plant access point using the Command/Response telemetry path that provides the nominally shortest or reliable optical path.

15. The computer-implemented method of claim 14, further comprising:

transitioning, by a wet plant manager located in a second cable landing station, from a standby mode to an active mode, wherein the wet plant manager in the active mode is configured to receive requests to communicate with a target Smart Undersea Network Element.

16. The computer-implemented method of claim 14, further comprising:
receiving, by the wet plant manager located in the first cable landing station, a wet plant manager alarm notification from at least one Smart Undersea Network Element, the wet plant manager alarm notification being provided by at least one wet plant access point associated with the at least one Smart Undersea Network Element;
sending, by the wet plant manager located in the first cable landing station, a command to silence alarm notifications by the at least one Smart Undersea Network Element;
determining, by the wet plant manager located in the first cable landing station, a candidate Smart Undersea Network Element;
sending, by the wet plant manager located in the first cable landing station, a request for alarm information to a selected wet plant access point to retrieve alarm information from the candidate Smart Undersea Network Element, the selected wet plant access point being associated with a Command/Response telemetry path that provides a nominally shortest or reliable optical path to the candidate Smart Undersea Network Element; and
sending, by the wet plant manager located in the first cable landing station, a request to re-enable alarm notifications to the at least one Smart Undersea Network Element in response to the candidate Smart Undersea Network Element being identified as an origin of the received wet plant manager alarm notification.

17. The computer-implemented method of claim 14, further comprising:
sending, by the wet plant manager located in the first cable landing station, a wet plant manager event to a network manager system, the wet plant manager event representing an update to a transmission trail associated with a Smart Undersea Network Element.

18. A non-transitory computer-readable medium having a plurality of instructions encoded thereon that when executed by at least one processor cause a wet plant manager process to be carried out, the process configured to:
receive a first request to communicate with a target Smart Undersea Network Element from a remote computing device, the first request including a command to perform via the target Smart Undersea Network Element;
select a wet plant access point to service the request based on the wet plant access point being coupled to a Command/Response telemetry path that provides a nominally shortest or reliable optical path to the target Smart Undersea Network Element; and
send a request to the selected wet plant access point, the request identifying the target Smart Undersea Network Element and the command.

19. The computer-readable medium of claim 18, the wet plant manager process being further configured to:
receive a wet plant manager alarm notification from at least one Smart Undersea Network Element via at least one wet plant access point associated with the at least one Smart Undersea Network Element;
send a command to silence alarm notifications to the at least one Smart Undersea Network Element;
determine a candidate Smart Undersea Network Element;
send a request for alarm information to a selected wet plant access point to retrieve alarm information from the candidate Smart Undersea Network Element, the selected wet plant access point providing a nominally shortest or reliable optical path to the candidate Smart Undersea Network Element; and
send a request to re-enable alarm notifications to the at least one Smart Undersea Network Element in response to the candidate Smart Undersea Network Element being identified as an origin of the received wet plant manager alarm notification.

20. The computer-readable medium of claim 19, wherein the selected wet plant access point providing the nominally shortest or reliable least error prone optical path to the candidate Smart Undersea Network Element is selected at least in part on at least one of a number of hops between the selected wet plant access point and the candidate Smart Undersea Network Element, a bit error rate being below a predefined threshold, and a bit error rate being below an average bit error rate for a plurality of Command/Response telemetry paths.

* * * * *